(12) United States Patent
Wei et al.

(10) Patent No.: US 8,712,989 B2
(45) Date of Patent: Apr. 29, 2014

(54) WILD CARD AUTO COMPLETION

(75) Inventors: Hao Wei, Beijing (CN); Matthew Robert Scott, Beijing (CN); Gang Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 59 days.

(21) Appl. No.: 12/960,258

(22) Filed: Dec. 3, 2010

(65) Prior Publication Data

US 2012/0143897 A1 Jun. 7, 2012

(51) Int. Cl.
*G06F 17/30* (2006.01)

(52) U.S. Cl.
USPC .......................................................... 707/706

(58) Field of Classification Search
None
See application file for complete search history.

(56) References Cited

U.S. PATENT DOCUMENTS

| | | | |
|---|---|---|---|
| 5,303,150 A | 4/1994 | Kameda | |
| 5,386,556 A | 1/1995 | Hedin et al. | |
| 5,485,372 A | 1/1996 | Golding et al. | |
| 5,655,129 A | 8/1997 | Ito | |
| 5,734,749 A * | 3/1998 | Yamada et al. | 382/187 |
| 5,778,361 A | 7/1998 | Nanjo et al. | |
| 5,787,422 A | 7/1998 | Tukey et al. | |
| 5,832,478 A | 11/1998 | George | |
| 5,896,321 A | 4/1999 | Miller et al. | |
| 5,926,652 A | 7/1999 | Reznak | |
| 5,963,671 A | 10/1999 | Comerford et al. | |
| 6,141,655 A | 10/2000 | Johnson et al. | |
| 6,339,776 B2 | 1/2002 | Dayani-Fard et al. | |
| 6,377,965 B1 | 4/2002 | Hachamovitch et al. | |
| 6,408,266 B1 | 6/2002 | Oon | |
| 6,424,358 B1 | 7/2002 | DiDomizio et al. | |
| 6,490,563 B2 | 12/2002 | Hon et al. | |
| 6,519,599 B1 | 2/2003 | Chickering et al. | |
| 6,556,990 B1 | 4/2003 | Lane | |
| 6,564,213 B1 | 5/2003 | Ortega et al. | |

(Continued)

FOREIGN PATENT DOCUMENTS

| | | |
|---|---|---|
| EP | 0924594 A2 | 6/1999 |
| JP | 09204445 | 8/1997 |

(Continued)

OTHER PUBLICATIONS

Merriam-Webster Collegiate Dictionary, 2000, Merriam-Webster, p. 486.*

(Continued)

*Primary Examiner* — Hung Q Pham
(74) *Attorney, Agent, or Firm* — Carole Boelitz; Micky Minhas; Lee & Hayes, PLLC

(57) ABSTRACT

Described herein is a technology that facilitates efficient wild card auto completion of an input term. The technology supports the input term including multiple, predefined, distinct wild card characters, escape characters, special characters with language specific functionality, delimiters, and context designation. Wild card auto completion is based on a regular expression engine that supports the multiple, predefined, wild card characters. In addition, the technology supports a single input that may include multiple parts including context, domain, parts of speech, and a number of words in a result phrase. In various embodiments the technology facilitates pattern optimization to merge a subset of consecutive homogenous wild card characters and provides a selection of matching tools based on criteria including the type of wild card character included in the input term and where the wild card character appears in the input term as well as context.

20 Claims, 12 Drawing Sheets

(56) References Cited

U.S. PATENT DOCUMENTS

| | | |
|---|---|---|
| 6,573,844 B1 | 6/2003 | Venolia et al. |
| 6,654,733 B1 | 11/2003 | Goodman et al. |
| 6,658,404 B1 | 12/2003 | Cecchini |
| 6,687,734 B1 | 2/2004 | Sellink et al. |
| 6,785,677 B1 | 8/2004 | Fritchman |
| 6,801,190 B1 | 10/2004 | Robinson et al. |
| 6,801,661 B1 | 10/2004 | Sotak et al. |
| 6,934,767 B1 | 8/2005 | Jellinek |
| 7,089,266 B2 | 8/2006 | Stolte et al. |
| 7,107,204 B1 | 9/2006 | Liu et al. |
| 7,133,876 B2 | 11/2006 | Roussopoulos et al. |
| 7,171,353 B2 | 1/2007 | Trower, II et al. |
| 7,181,450 B2 | 2/2007 | Malloy et al. |
| 7,225,200 B2 | 5/2007 | Chickering et al. |
| 7,236,923 B1 | 6/2007 | Gupta |
| 7,277,029 B2 | 10/2007 | Thiesson et al. |
| 7,349,981 B2 | 3/2008 | Guerrero |
| 7,383,299 B1 | 6/2008 | Hailpern et al. |
| 7,395,203 B2 | 7/2008 | Wu et al. |
| 7,505,985 B2 | 3/2009 | Kilroy |
| 7,539,656 B2 | 5/2009 | Fratkina et al. |
| 7,617,205 B2 | 11/2009 | Bailey et al. |
| 7,769,804 B2 | 8/2010 | Church et al. |
| 2001/0048753 A1 | 12/2001 | Lee et al. |
| 2002/0099536 A1 | 7/2002 | Bordner et al. |
| 2002/0099581 A1 | 7/2002 | Chu et al. |
| 2002/0103809 A1 | 8/2002 | Starzl et al. |
| 2002/0116528 A1 | 8/2002 | Vale |
| 2002/0123994 A1 | 9/2002 | Schabes et al. |
| 2002/0138479 A1 | 9/2002 | Bates et al. |
| 2002/0156779 A1 | 10/2002 | Elliott et al. |
| 2003/0061027 A1 | 3/2003 | Weise et al. |
| 2003/0212702 A1 | 11/2003 | Campos et al. |
| 2004/0201607 A1 | 10/2004 | Mulvey et al. |
| 2004/0260534 A1 | 12/2004 | Pak et al. |
| 2004/0267737 A1 | 12/2004 | Takazawa et al. |
| 2005/0050095 A1 | 3/2005 | Hurtis et al. |
| 2005/0102131 A1 | 5/2005 | Trower, II et al. |
| 2005/0144064 A1 | 6/2005 | Calabria et al. |
| 2005/0283468 A1 | 12/2005 | Kamvar et al. |
| 2006/0047701 A1 | 3/2006 | Maybury et al. |
| 2006/0085392 A1 | 4/2006 | Wang et al. |
| 2006/0123338 A1 | 6/2006 | McCaffrey et al. |
| 2006/0163337 A1 | 7/2006 | Unruh |
| 2006/0206454 A1 | 9/2006 | Forstall et al. |
| 2006/0290535 A1* | 12/2006 | Thiesson et al. .............. 341/22 |
| 2007/0011154 A1 | 1/2007 | Musgrove et al. |
| 2007/0136256 A1 | 6/2007 | Kapur et al. |
| 2007/0143262 A1 | 6/2007 | Kasperski |
| 2007/0147269 A1 | 6/2007 | Ettle et al. |
| 2007/0164782 A1 | 7/2007 | Church et al. |
| 2007/0168469 A1 | 7/2007 | Church et al. |
| 2007/0185859 A1 | 8/2007 | Flowers et al. |
| 2007/0233651 A1 | 10/2007 | Deshpande et al. |
| 2007/0255552 A1 | 11/2007 | Thiesson et al. |
| 2007/0282811 A1 | 12/2007 | Musgrove |
| 2008/0052152 A1 | 2/2008 | Yufik |
| 2008/0071740 A1 | 3/2008 | Jhala et al. |
| 2008/0104101 A1* | 5/2008 | Kirshenbaum et al. ....... 707/102 |
| 2008/0133752 A1 | 6/2008 | Liekens et al. |
| 2008/0140519 A1 | 6/2008 | Thiesson et al. |
| 2008/0158201 A1* | 7/2008 | Yoshida .......................... 345/179 |
| 2008/0201326 A1* | 8/2008 | Cotter et al. ..................... 707/5 |
| 2009/0055386 A1 | 2/2009 | Boss et al. |
| 2009/0063404 A1 | 3/2009 | Hacigumus et al. |
| 2010/0100369 A1* | 4/2010 | Shetty et al. ...................... 704/4 |
| 2011/0022621 A1* | 1/2011 | Luo et al. ....................... 707/769 |
| 2012/0005184 A1* | 1/2012 | Thilagar et al. ............... 707/706 |

FOREIGN PATENT DOCUMENTS

| | | |
|---|---|---|
| JP | 11345247 | 12/1999 |
| JP | 2002506256 | 2/2002 |
| JP | 2004504674 | 2/2004 |
| JP | 2008505407 | 2/2006 |
| JP | 2006107502 | 4/2006 |
| WO | WO0182119 A2 | 11/2001 |

OTHER PUBLICATIONS

International Search Report dated Sep. 28, 2007 for PCT Application Serial No. PCT/US2007/008570, 7 Pages.

MSN Desktop Search (beta), http://www.pcmag.com/article2/0,1759,1771841,OO.asp, last accessed Jun. 23, 2005.

Using the Word Wheel, Technical Tips, http://w.isys-search.com/supporVtechtips/wordwheel.html, last accessed Jun. 23, 2005.

I. H. Witten, et al. Managing Gigabytes: Compressing and Indexing Documents and Images, by Morgan Kaufmann Publishing, San Francisco, 1999, pt. 3, 65 pages, (102-166).

I. H. Witten, et al. Managing Gigabytes: Compressing and Indexing Documents and Images, by Morgan Kaufmann Publishing, San Francisco, 1999, pt. 4, 55 pages, (167-221).

I. H. Witten, et al. Managing Gigabytes: Compressing and Indexing Documents and Images, by Morgan Kaufmann Publishing, San Francisco, 1999, pt. 5, 48 pages, (222-270).

I. H. Witten, et al. Managing Gigabytes: Compressing and Indexing Documents and Images, by Morgan Kaufmann Publishing, San Francisco, 1999, pt. 6, 58 pages, (271-328).

I. H. Witten, et al. Managing Gigabytes: Compressing and Indexing Documents and Images, by Morgan Kaufmann Publishing, San Francisco, 1999, pt. 7, 60 pages, (329-388).

I. H. Witten, et al. Managing Gigabytes: Compressing and Indexing Documents and Images, by Morgan Kaufmann Publishing, San Francisco, 1999, pt. 2, 65 pages, (37-101).

I. H. Witten, et al. Managing Gigabytes: Compressing and Indexing Documents and Images, by Morgan Kaufmann Publishing, San Francisco, 1999, pt. 8, 65 pages, (389-452).

I. H. Witten, et al. Managing Gigabytes: Compressing and Indexing Documents and Images, by Morgan Kaufmann Publishing, San Francisco, 1999, pt. 9, 67 pages, (453-back cover).

I. H. Witten, et al. Managing Gigabytes: Compressing and Indexing Documents and Images, by Morgan Kaufmann Publishing, San Francisco, 1999, pt. 1, 65 pages, (front cover-36).

Chinese Office Action mailed Aug. 17, 2011 for Chinese patent application No. 200780015952.9, a counterpart foreign application of U.S. Appl. No. 7,778,837, 8 pages.

Sanders, "Microsoft play mobile search 'wild card'", retrived at <<http://www.themauritius.com/redirect/index.php?url=http://www.pcw.co.uk/vnunet/news/2155193/microsoft-plays-wild-card>>, Published May 3, 2006 pp. #1-pp. #3.

Zhou et al., "A New Wildcard Search Method for Digital Dictonary Based on Mobile Platfom", Proceedings of the 16th International Conference on Artificial Reality and Telexistence, 2006, pp. #1-pp. #5.

J. L Bentley, Multidimensional binary search trees used for associative searching, Commun. ACM, 18:9, pgs. IO.A) 1 509-517,1975.

Church, et al., "The Wild Thing!", Proceedings of the ACL Poster and Demonstration Sessions, 2005, pp. 93-96.

Ding et al., "Computing Geographical Scopes of Web Resources", Proceedings of the 26th VLDB Conferece, Cario, Egypt, 2000, paper 326, pp. #1-pp. #23.

St Dumais, et al. Stuff I've Seen: A system for personal information retrieval and re-use, SIGIR, 2003.

Isys Search Software, "Using the Word Wheel", retirved at <<http://www.isys-search.com/support/techtips/wprdwheel.html>> on Jun. 23, 2005.

Jelinek, "Statistical Methods for Speech Recognition", 1997, Massachusetts Institute of Technology, pp. #60-pp. #67.

McIlroy, "Development of a Spelling List", IEEE Trans. on Communications 30, 1982, pp. #91-pp. #99.

M. Mohri, et aL Weighted Finite-State Transducers in Speech Recognition. Computer Speech and Language, 16(1), 4 pages. 69-88, 2002.

PC Magazine, "MSN Desktop Search", retrived at <<http://www.pcmag.com/article2/0,1759,1771841,00.asp>> on Jun. 23, 2005.

PCT Search Report dated Sep. 28, 2007 for PCT/US2007/008570.

(56) References Cited

OTHER PUBLICATIONS

Wang et al., "Detecting Dominant Locations from Search Queries", SIGIR '05, Aug. 15-19, 2005, Salvador, Brazil, pp. #1-pp. #8.
Witten et al., "Managing Gigabytes Compressing and Indexing Document and Images", Morgan Kaufmann Publishing, San Francisco, 1999, pp. # front cover-pp. #36 (65 pages).
Chinese Office Action mailed Janaury 29, 2012 for Chinese patent application No. 200780003211.9, a counterpart foreign application of U.S. Appl. No. 11/332,954, 5 pages.
Chinese Office Action mailed Apr. 23, 2012 for Chinese patent application No. 200780015952.9, a counterpart foreign application of U.S. Appl. No. 7,778,837, 6 pages.
Extended European Search Report mailed Feb. 15, 2012 for European patent application No. 07754994.7, 9 pages.
Japanese Office Action mailed Jun. 22, 2012 for Japanese patent application No. 2009-509573, a counter part foreign application of U.S. Appl. No. 7,778,837, 8 pages.
Office Action for U.S. Appl. No. 11/332,954, mailed on Mar. 1, 2012, Kenneth W. Church, "Multi-Word Word Wheeling", 16 pgs.
"Advanced Querying and Information Retrieval", Database System Concepts 4th Edition, Chapter 22, Silberschatz, Korth and Sudarshan, Retrieved on Nov. 14, 2007 at <<http://www.cwi.nl/—mk/onderwijs/dbtech/assets/ch22.ppt>>, 78 pgs.

Barman, et al., "Parsimonious Explanations of Change in Hierarchical Data", In the Proceedings of the IEEE 23rd International Conference on Data Engineering, Apr. 2007, pp. 1273-1275.
Blei, et al., "Hierarchical Bayesian Models for Applications in Information Retrieval", Oxford University Press, Bayesian Statistics, 2003, vol. 7, pp. 25-43.
Korean Office Action mailed Feb. 20, 2013 for Korean patent application No. 10-2008-7026116, a counterpart foreign application of U.S. Appl. No. 7,778,837, 4 pages.
Korean Office Action mailed Apr. 11, 2013 for Korean patent application No. , a counterpart foreign application of U.S. Appl. No. 11/332,954, 7 pages.
Monaci, et al., "Image Compression with Learnt Tree-Structured Dictionaries", IEEE, In the Proceedings of the 6th Workshop on Multimedia Signal Processing, 2004, pp. 35-38.
MSN Desktop Search (beta), Review by PC Magazine, retrieved from http://www.pcmag.com/article2/0,1759,1771841,OO.asp, last accessed Jun. 23, 2005, 2 pgs.
Vester, et al., "Information Retrieval in Document Spaces Using Clustering", Master's Thesis, Department of Informatics and Mathematical Modeling, Technical University of Denmark, Aug. 2005, 266 pgs.

\* cited by examiner

```
402 ─┐  public static bool Match(string pattern, int patternStartIndex, int
         patternLength, string dictionary, int dictionaryStartIndex, int
         dictionaryLength)
       {
404 ─┐     if (patternStartIndex == patternLength)
           {
               return dictionaryStartIndex == dictionaryLength;
           }
           else if (pattern[patternStartIndex] == '*')
           {
408 ─┐         if (patternStartIndex == patternLength - 1)
               {
                   return true;
               }
               else
               {
                   char c = char.ToUpperInvariant(pattern[patternStartIndex
                       + 1]);
                   for (int k = dictionaryStartIndex; k < dictionaryLength;
                       ++k)
                   {
406          412 ─┐     if (c == char.ToUpperInvariant(dictionary[k]))
                       {
                           if (Match(pattern, patternStartIndex + 2,
                               patternLength, dictionary, k + 1,
    410 ─┐                   dictionaryLength))
                           {
                               return true;
                           }
                       }
                       else if (c == '?')
                       {
                           if (Match(pattern, patternStartIndex + 2,
                               patternLength, dictionary, k + 1,
             414 ─┐         dictionaryLength))
                           {
                               return true;
                           }
                       }
                   }
416 ─┐         return false;
               }
           }
           else if (dictionaryStartIndex == dictionaryLength)
418 ─┐     {
               return false;
           }
           else if (char.ToUpperInvariant(pattern[patternStartIndex]) ==
               char.ToUpperInvariant(dictionary[dictionaryStartIndex]))
420 ─┐     {
               return Match(pattern, patternStartIndex + 1, patternLength,
                   dictionary, dictionaryStartIndex + 1, dictionaryLength);
           }
           else if (pattern[patternStartIndex] == '?')
422 ─┐     {
               return Match(pattern, patternStartIndex + 1, patternLength,
                   dictionary, dictionaryStartIndex + 1, dictionaryLength);
           }
           else
424 ─┐     {
               return false;
           }
       }
```

704(A)
| | |
|---|---|
| haapalaite | 叠羟横硫镍矿 |
| haarcialite | 纤沸石 |
| hable | [书面语]能干的,熟练的 |
| habilitate | 具备资格[尤指德国大学中的教师资格等] |
| habit plane | 晶析面 |
| habit type | 晶体习性类型 |
| habitable | 可居住的,适于居住的 |
| habitable house | 住所 |
| habitat type | 生境型 |

704(B)
| | |
|---|---|
| haapalaite | haapalaite |
| haarcialite | haarcialite |
| habile | habile |
| habilitate | habilitate |
| habit plane | plan d'habitude |
| habit type | type de habit |
| habitable | habitable |
| habitable house | maison habitable |
| habitat type | type d'habitat |

| c?k? | |
|---|---|
| cake | 饼,糕,[古语]扁形小面包,[苏格兰语]燕麦饼;[美国]烧饼 |
| caky | 饼状的,凝固了的 |
| CCKW | 逆时针方向的 |
| coke | 焦(炭) |
| cuke | 小黄瓜 |

| c?k? | |
|---|---|
| cake | gâteau |
| caky | caky |
| CCKW | CCKW (des aiguilles) |
| coke | coke |
| cuke | concombre (informel) |

WILD CARD AUTO COMPLETION

BACKGROUND

While several online dictionaries provide an auto completion feature that predicts a term from a user's partial input of the term, these online dictionaries rely on matching the partial input entered. Thus such online dictionaries do not help a user who does not know how to spell the initial part of the term or who is not sure of the letters for multiple locations in the term. In addition, such dictionaries only support input of a single type of wild card character as well as a single wild card character per term.

SUMMARY

A technology that facilitates wild card auto completion based on a regular expression engine that supports multiple predefined wild card characters in a single input term is described herein. In various embodiments, the technology facilitates pattern optimization to aggregate a subset of consecutive homogenous wild card characters. In some embodiments, the technology provides a selection of matching tools based on a type of wild card character and where the wild card character appears in the input term.

In at least one embodiment, the technology employing pattern optimization with selected matching tools improves matching efficiency of input terms to dictionary or database entries. In several embodiments, users may seek input terms that they do not know how to spell, including multi-word input terms, e.g. "happy birthday."

In some embodiments, the technology for wild card auto completion may serve as a learning tool for language students including extending input terms to include context, domain, parts of speech, etc.

In various embodiments the technology for wild card auto completion includes a presentation refinement functionality that provides output to enhance a user interface presentation via ranking, tagging, merging, and other inline presentation enhancement. For example, output may be tagged to highlight the letters or non wild card characters of the term that a user typed, in contrast to those corresponding to wild card(s).

This Summary is provided to introduce a selection of concepts in a simplified form that are further described below in the Detailed Description. This Summary is not intended to identify key or essential features of the claimed subject matter, nor is it intended to limit the scope of the claimed subject matter.

BRIEF DESCRIPTION OF THE DRAWINGS

The Detailed Description is set forth with reference to the accompanying figures. In the figures, the left-most digit of a reference number identifies the figure in which the reference number first appears. The use of the same reference numbers in different figures indicates similar or identical items. A reference number with a parenthetical suffix (e.g., "104(1)" or "110(A)") identifies a species of the feature represented by the general reference number (e.g., "104" or "110"). Use of the general reference number without a parenthetical suffix (e.g., "104" or "110") identifies the genus or any one or more of the species.

FIG. 4 is an example code snippet for lightweight regular expression parsing.

FIGS. 7A, 7B, 8A, 8B, 9A, and 9B are examples of user interface presentations for wild card auto completion.

DETAILED DESCRIPTION

Overview

Figure 1:
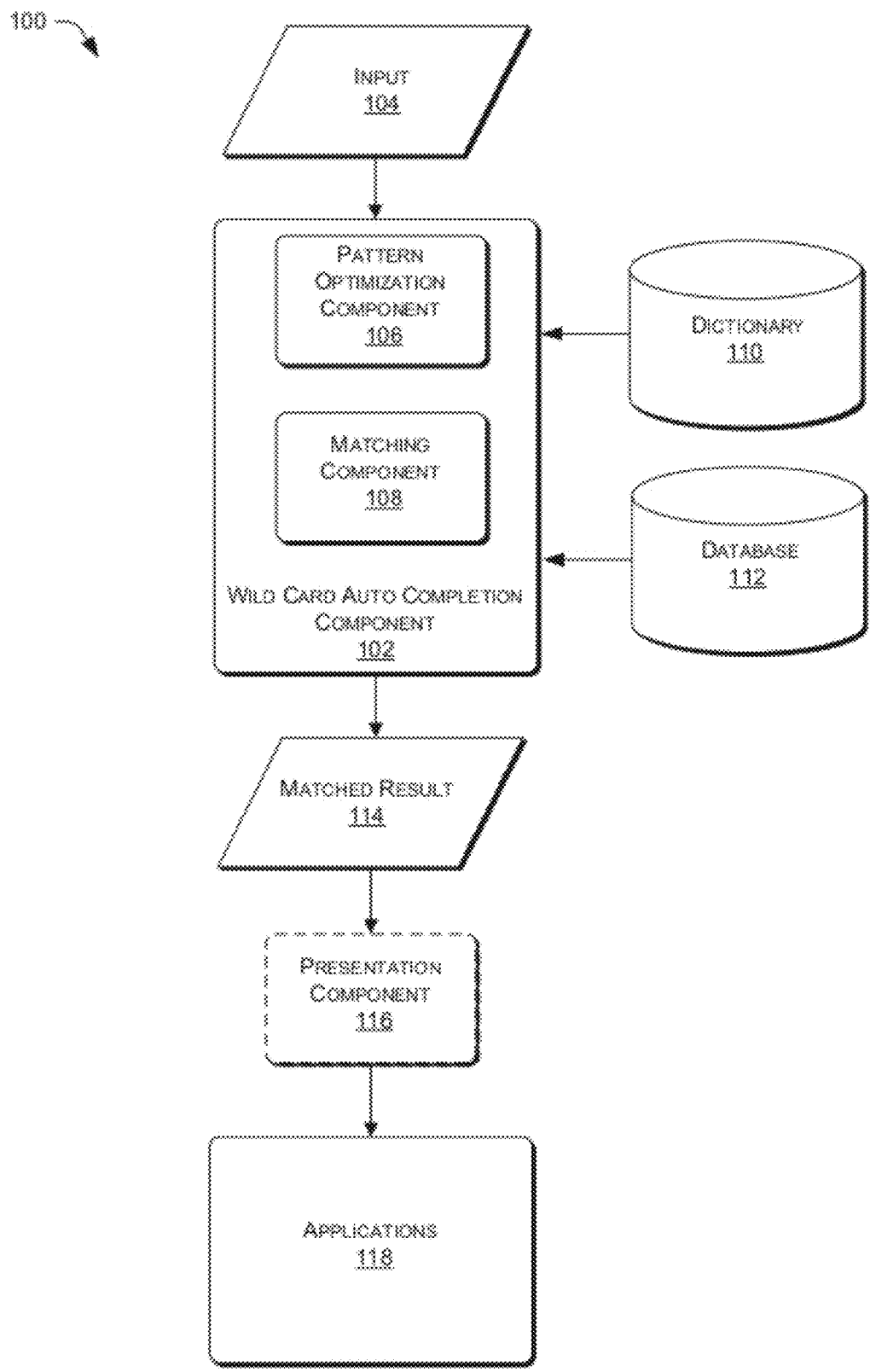
FIG. 1 is a block diagram of an example framework for wild card auto completion.

This disclosure is directed to a framework and techniques for wild card auto completion, e.g., a matching technology that receives multiple diverse wild card characters. In the described techniques, the wild card characters may be entered anywhere in an input term, and a list of matches to the term are returned. The described operations extend prefix match auto completion to wild card auto completion by employing a sorted list plus binary search approach. In various embodiments prefix match auto completion may also use a trie tree approach. However, to use a trie tree approach, the trie tree approach must be specially extended to work with wild card auto completion as described herein.

The framework receives input terms that may contain multiple, predefined, diverse wild card characters that may appear in any location in the input term. Example predefined diverse wild card characters include, but are not limited to, a single-character wild card character, e.g., "?", and a zero to multiple-character wild card character, e.g., "*". The framework may be programmed to accept user configurable escape characters in the event a predefined wild card character is a non wild card character in a particular input term. The framework may also be programmed to include criteria for designating a number of words in a phrase, parts of speech, context, and domain for a vertical search. The framework may be programmed to search multiple sources based on a single input term. In addition, the framework is programmed to prevent dead loop injection, e.g., endless loops, by restricting the type of wild card characters allowed while enabling input of multiple wild cards of at least two types in a single input term.

In several embodiments, users may seek terms that they do not know how to spell, including multi-word terms, e.g. "happy birthday." For example, English as a Second Language (ESL) users may not know letters or characters found at multiple locations, including the first letter or character, of terms that they seek, or such users may know how to spell one word of a multi-word term while not knowing how to spell the other word of the multi-word term.

The technology for wild card auto completion may serve as a learning tool for language students by presenting definitions, synonyms, and uses in context for dictionary or database entries matched to the input terms. In various embodiments, wild card auto completion may be enabled for a variety of initial-target language pairs, e.g., Chinese-English, English-Chinese, English-French, French-English, Chinese-French, French-Chinese, etc. For example, an input term including at least one wild card of multiple, predefined, wild cards may be received in a target language, and the dictionary entries that are matched to the term may also be in the target language, while the definitions may be presented in an initial language.

The wild card auto completion framework may receive an input term including one part or word having wild cards in a target language and another part or word presented in an initial language. In some instances, one or both of the parts may have escape characters and/or special characters with language-specific functionality as well as having context, domain, parts of speech, and/or number of words designated in the wild card auto completion syntax. The wild card auto completion framework may provide for extended matching conducted in text/string, dictionary entries, and/or database entries as well as performing matching in both initial and target languages to reduce the search space to accelerate obtaining results.

The technology for wild card auto completion includes a presentation refinement functionality that enhances matched results. For example, an enhanced user interface provides output tagged to highlight the letters or non wild card characters of the input term that a user provided in contrast to those corresponding to wild card(s). As another example, results may be ranked, merged from multiple sources, grouped by context or domain, number of words, popularity, and/or number of input errors.

Although, as described, wild card auto completion is discussed with distinct initial-target language pairs including English, the techniques described herein are also useful when the initial language and target language are not wholly distinct, e.g., they are the same or are dialects, as well as when English is neither the initial nor target language. While various operations are described throughout the application as being performed by the illustrated components, in alternate embodiments the operations may be performed by alternate components or equivalents thereof.

Example Framework

FIG. 1 illustrates an example framework 100 for implementing wild card auto completion. The components of framework 100 represent, for example, hardware that is machined, molded, adapted, or configured to implement wild card auto completion as described herein. Framework 100 includes a wild card auto completion component 102 that receives input 104, for example, through a network interface (not shown). The wild card auto completion component 102 includes a pattern optimization component 106 and a matching component 108. Although illustrated separately, wild card auto completion component 102 includes or has access to one or more dictionaries 110 and databases 112. Wild card auto completion component 102 obtains entries from dictionaries 110 or databases 112 for matching by matching component 108.

The pattern optimization component 106, parses the input as a string, and is configured to perform one or more optimizations. The pattern optimization component 106 is programmed to ascertain whether one or more wild card characters are a part of the input, whether such wild card characters are of the same or diverse types, whether wild card characters of the same type are consecutive, whether the input contains words of more than one language, the number of letters or characters of the input, (e.g., length of the input), whether the input is made up of more than one word, etc. The length of the input term may be predetermined, configurable, limited, and/or unlimited.

The pattern optimization component, 106, recognizes an escape character or mechanism so that words input containing the same symbol as that which represents a wild card character may be correctly interpreted as an input term. The pattern optimization component 106 also recognizes special characters that have language functions in the wild card auto completion syntax. For example, special characters that may vary by language include, but are not limited to, hyphens and spaces in English or French and hyphens or dashes (破折号) in Chinese. In addition, the pattern optimization component recognizes indications of a number of words, a part of speech, and context in the wild card auto completion syntax.

In addition, the wild card auto completion component 102 may store a number of predefined pattern types or pattern strings, e.g., wild card pattern types, parts of speech pattern types, single or multi word pattern types, etc. (not shown). In an example, if the input includes multiple, consecutive zero to multiple-character replacement wild card characters, e.g., "", then the pattern optimization component 106 optimizes the input by replacing the "" with "*", which has the same meaning, but is more efficient to process.

The matching component 108 matches the optimized input to one or more of the predefined pattern types based on the location and type of wild card characters included in the input term. In various embodiments, matching occurs against one or more databases, vertical spaces, and/or text/strings. A search space may be reduced by employing both the initial and target languages in some instances. Matching against both the initial and target languages includes accepting a multi-part input term including input characters in the target language with one or more of a context, which may be received in the initial language, a domain for vertical search in either the initial or target language, a part of speech, and an indication of the number of words for the matched result.

In one example process, an input term is examined to determine whether the input term matches a pattern that begins with a wild card. If the input term begins with a wild card, the type of wild card is determined. The input term is examined character by character for comparison to dictionary entries. Various parameters are used to represent characteristics of the input term. Parameters include a pattern string parameter represents the optimized input term, including any wild card characters, e.g., "?" and "*" from the input term. Another parameter, patternStartIndex, is an integer representing the location to start matching the input term to dictionary entries. A third parameter patternLength, is an integer that represents the length of the input term in terms of the number of characters entered, e.g., for "?a*", patternLength=3. Several corresponding parameters represent characteristics of the dictionary entries that are parsed to identify one or more matches to the input term. A dictionary string parameter represents the dictionary entry being compared to the input term. Another parameter, dictionaryStartIndex, is an integer representing the location to start matching the dictionary entry to the input term. A third parameter, dictionaryLength, is an integer that represents the length of the dictionary entry in terms of a number of characters. At the end of the example process, when a return value is true, the dictionary entry matches the pattern of the input term; otherwise, the return value is false.

In the example illustrated, operations of the wild card auto completion component 102 result in a matched result 114. In some instances, a presentation component 116 refines the matched result 114 for use by applications 118. For example in various embodiments, presentation component 116 includes one or more of a marking component and a ranking component with ranking based on popularity, error rate, or domain, as well as a variety of presentation options such as options to show or hide definitions, phrases, examples, and phonetic symbols. Presentation component 116 adapts the presentation of results to be configurable by a user or calling application 118 in various implementations. In one example implementation, presentation component 116 includes a marking component that tags the matched result 114 to support enhanced display by applications 118.

When the input 104 matches a pattern type or pattern string, the matching component 108 selects a matching process to apply to the input based on the matched pattern type and produces one or more matched results 114. The matched results 114 represent entries from a dictionary of the target language that match the input and the pattern.

FIG. 1 also illustrates that output generated from the wild card auto completion may be used in any of multiple applications. The matched results 114 may be processed by the presentation component 116 that includes the marking component, which applies tags to enhance presentation and/or improve a user learning experience when the matched results are served to any of a variety of applications 118.

Applications 118 may include, for example, a browser, applications providing dictionary services, language learning services, translation services, etc.

Figure 2:
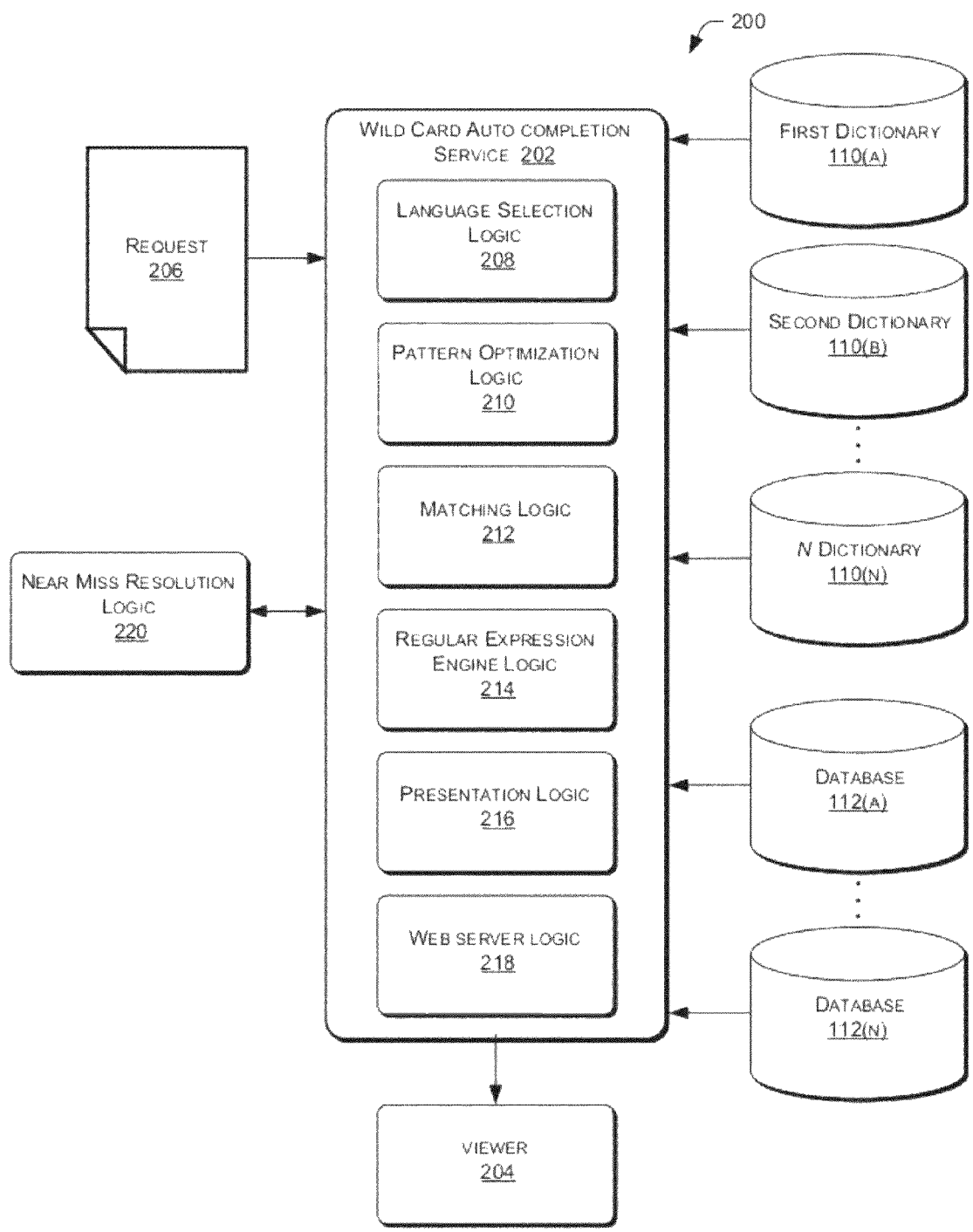
FIG. 2 is a system diagram showing illustrative logical relationships between aspects of a wild card auto completion service.

FIG. 2 shows a system, 200, that performs wild card auto completion.

System 200 includes a wild card auto completion service 202 that provides results through a viewer 204, oftentimes in response to a request 206. The wild card auto completion service 202 may be implemented as a network-based service such as an Internet site, also referred to as a website. The website and its servers have access to other resources of the Internet and World-Wide-Web, such as various content and databases.

In at least one implementation, viewer 204 is an Internet browser that operates on a personal computer or other device having access to a network such as the Internet. Various browsers are available, such as Microsoft Corporation's Internet Explorer™. Internet or web content may also be viewed using other viewer technologies such as viewers used in various types of mobile devices, or using viewer components in different types of application programs and software-implemented devices.

In the described embodiment, the various devices, servers, and resources operate in a networked environment in which they can communicate with each other. For example, the different components are connected for intercommunication using the Internet. However, various other private and public networks might be utilized for data communications between entities of system 200.

In system 200, wild card auto completion service 202, which is coupled to viewer 204, serves content responsive to request 206. Wild card auto completion service 202 utilizes one or more of language selection logic 208, pattern optimization logic 210, matching logic 212, regular expression engine logic 214, and web server logic 218 to obtain content from one or more dictionaries 110 or databases 112. As illustrated, dictionaries may be implemented to store content separated by language such that dictionary 110(A) contains content in a first language, dictionary 110(B) contains content in a second language, etc. Similarly, databases 112(A) to 112(N) may be implemented to store content separated by context, domain, and language. Dictionary terms, context sentences, and definitions may be obtained from any of a variety of sources including by mining databases 112 and web pages, and may be provided to the user through various applications 118, such as a browser, dictionary services, translation services, language teaching service, web browser interfaces, etc. The dictionaries 110 and databases 112 may be populated and/or updated at regular intervals with data obtained via web mining as mentioned above.

Language selection logic 208 determines an initial-target language pair represented by request 206. Language selection logic 208 selects at least one source for matching from multiple sources such as dictionaries 110 and databases 112. In the illustrated example, language selection logic 208 selects at least one dictionary 110 from which content should be obtained.

In various embodiments the request 206 includes input 104 and is used by language selection logic 208 to determine a dictionary to be used by wild card auto completion service 202. Request 206 can represent various types of user control including, but not limited to, explicit language selection and input terms made up of a part of a word, a single word, or a plurality of words, any of which may include wild card characters.

As one example, "A*" is a computer algorithm used in graph traversal. When an escape character such as "\" is used before a predetermined wild card character in an input term, e.g., the asterisk, the escape character controls how the asterisk is valued. The pattern optimization logic 210 recognizes the asterisk as a non wild card character of the input rather than as a wild card character. Hence, the "\*" is accorded a Unicode value for comparison as discussed below. Thus, in an example implementation, matching logic 212 matches an input term received as "A\* alg?ri*", to a dictionary entry "A* algorithm" but not to "access algorithm" or "adaptive algorithm", as would happen were the escape character omitted.

As another example, request 206 may include a request for a specific part of speech. For example, if the received input term is "*b(verb)" and the target language is English, a verb ending in the letter "b" is sought. Language selection logic selects an English dictionary 110 and matching logic 212 obtains "climb" and "plumb" as matched results 114.

As another example, when request 206 includes a delimiter, e.g., "|", pattern optimization logic 210 ascertains that matched results should be limited to the context or domain following the delimiter. In some instances the context may be received in the initial language while other parts of the input term are received in the target language. For example, when an input term "pl*|平" is received, the pattern optimization logic 210 recognizes that the input term indicates that an English word beginning with the letters "pl" in the context " 平 " (i.e., flat) is sought. Matching logic 212 matches the input term to an English dictionary 110 filtered based on the context to obtain "plane: 平面" and "plain: 平地, 平淡" as matched results 114.

As yet another example, request 206 may indicate a number of words to be included in the result, which in some instances represents a whole word wildcard, e.g., "\w", so that the pattern optimization logic 210 ascertains that results should be limited to those matching the number of words requested. For example, given the input term "\w \w of", pattern optimization logic ascertains that a three word phrase ending with the word "of" is sought, and matching logic 212 may obtain entries "in terms of" and "in front of" from an English database 112 as matched results 114.

In various embodiments, the regular expression engine logic 214 operates in concert with one or more of language selection logic 208, pattern optimization logic 210, matching logic 212, presentation logic 216, and web server logic 218. Alternately or additionally, regular expression engine logic 214 may operate independent of the other components illustrated in wild card auto completion service 202.

Regular expression engine logic 214 facilitates discovering terms that match a user input that can include multiple, predefined, diverse wild card characters in a single input. In addition, regular expression engine logic 214 includes support for input in multiple languages as discussed above. Although several examples discussed herein represent lightweight regular expression engine logic for text/string matching, in various embodiments the expression engine logic 214 supports an extended language-search-specific regular expression syntax.

Presentation logic 216 refines results to enhance user experience. In various embodiments presentation logic includes one or more of merging logic, ranking logic, marker logic, and inline enhancement logic, although additional refinements are envisioned. As one example, marker logic tags results based on the determination made by regular expression engine logic 214 of characters to replace the wild card characters corresponding to request 206. As another example, inline enhancement logic enhances the results returned by providing an inline definition or example of the result, e.g., matched dictionary entry in a phrase or sentence. In some instances the enhancement includes phonetic symbols to assist with pronunciation and learning In still other instances the enhancement may include indications of user approval or popularity. As yet another example, presentation logic 216 refines the results returned using ranking logic to order the results based on a number of dictionary entries corresponding to the input term in a particular context, popularity of the input term as a search term, and based on frequency of errors by users when inputting the term.

Web server logic 218, in some instances, responds to various requests, such as requests from viewer 204 and/or request 206, by providing appropriate content. Microsoft's IIS (Internet Information Services) is an example of widely used software that might be used in this example to implement web server logic 218. For example, web server logic 218 may receive a request 206, and may access various types of content, including dictionaries 110. In various implementations, language selection logic 208 operates with web server logic 218 to facilitate selection from dictionaries 110 or other sources of content.

Wild card auto completion service 202 may generate a response to request 206 based on data retrieved from one or more third-party sources. For example, a dictionary 110 may represent an example of a third party source in some implementations.

Wild card auto completion service 202 may include or have access to near miss resolution (NMR) logic 220. Rather than producing an error, wild card auto completion service 202 may use NMR logic 220 to reconcile instances when language selection logic 208, regular expression engine logic 214, or matching logic 212 fail to obtain content from one or more dictionaries 110 or databases 112.

Figure 3:
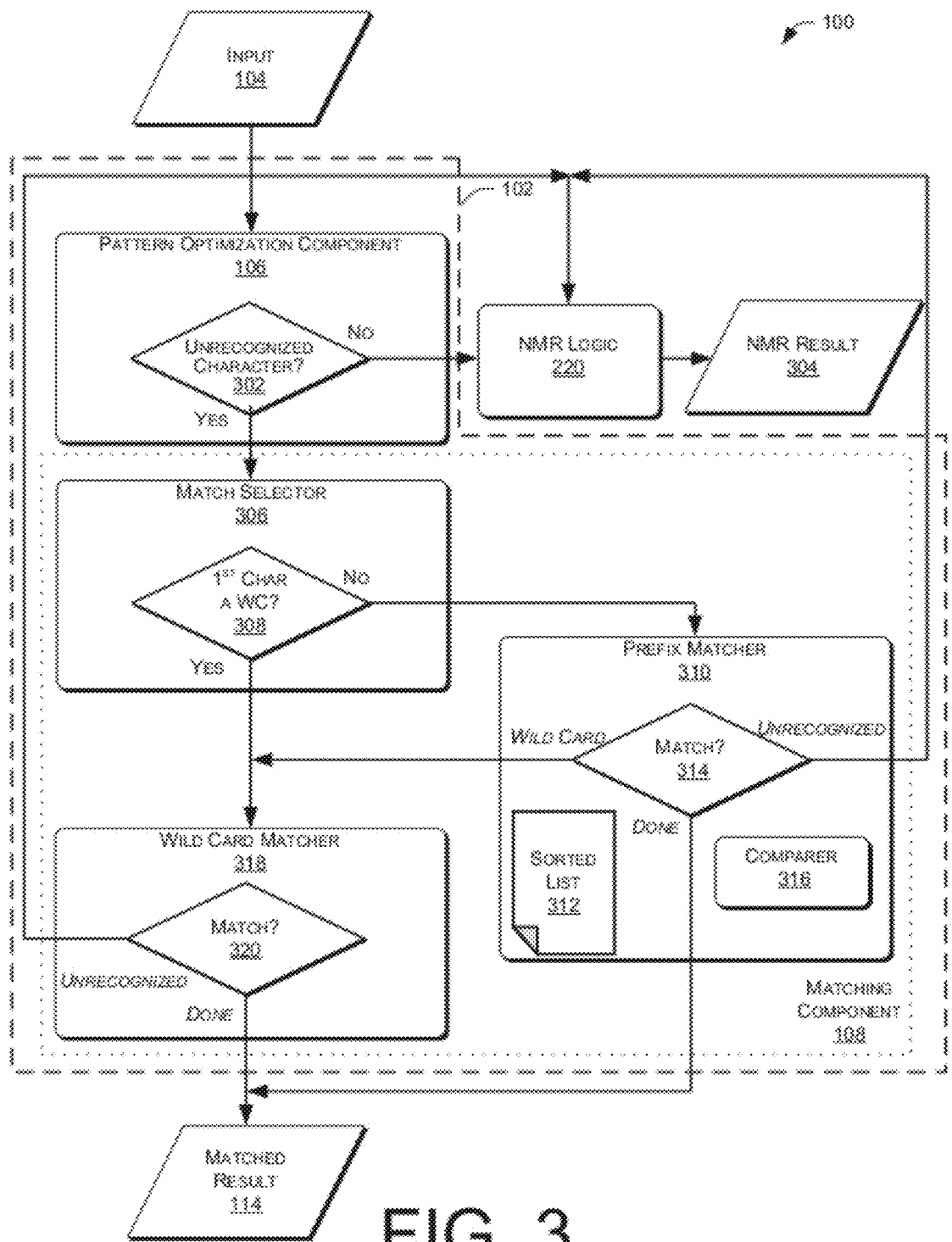
FIG. 3 is another block diagram of an example framework for wild card auto completion.

FIG. 3 illustrates additional aspects of framework 100 that may be implemented via the system 200 illustrated in FIG. 2.

Components of wild card auto completion component 102 are illustrated within the dashed line, while aspects of the matching component 108 are illustrated within the dotted line.

The pattern optimization component 106 parses input 104, starting with the first character (represented by the patternStartIndex parameter defined above). In some languages, the patternStartIndex may represent the left-most input character, while in other languages, patternStartIndex may represent the right-most input character or other position, e.g., for languages that are written vertically.

In the embodiment illustrated in FIG. 3, at 302, pattern optimization component 106 determines whether the first character of the input term is recognized. Although in an alternate embodiment another component, such as match selector 306 may determine whether the first character of the input term is recognized. When the first character is not recognized, e.g., is a number, is a symbolic character, or is a character from an alphabet that is not a part of the initial-target language pair, the input is passed to near miss resolution (NMR) logic 220 to obtain an NMR result shown at 304. In some embodiments, the pattern optimization component 106 probes the totality of the input characters, not just the first character, to determine whether any character in of the input term is unrecognized at 302. When an unrecognized character is found in the input term, the input is passed to NMR logic 220 to obtain an NMR result 304.

When the first character is recognized, e.g., is a predefined wild card character or is a character from an alphabet that is a part of the initial-target language pair, the pattern optimization component 106 parses the remaining input characters to determine whether there are any escape characters, context delimiters, parts of speech signals, or a series of multiple, consecutive zero to multiple-character wild card characters, e.g., "". When the input includes any of these characters the pattern optimization component 106 optimizes the input for matching. For example, when the input includes a series of predefined wild card characters, the pattern optimization component 106 optimizes the input by replacing the series of predefined wild card characters with a single predefined wild card character, e.g., replaces "" with "*".

When processing is completed by the pattern optimizer and the first character is recognized, e.g., is a predefined wild card character or is a character from an alphabet that is a part of the initial-target language pair, the input is passed to match selector 306, which is a part of matching component 108.

The match selector 306 identifies the first character as a wild card character or non wild card character at 308. Based at least on whether the first character is a wild card, match selector 306 selects a matcher to begin matching the input. In some instances, (not shown) the match selector 306 determines that multiple queries are to be run against multiple databases 112, such as when input is received in multiple languages. When the first character is not a wild card, the input is passed to prefix matcher 310.

In some embodiments the wild card auto completion component 102 uses a sorted list 312 to store entries from a dictionary 110 or database 112 (not shown). At 314, the prefix matcher 310 scans the sorted list 312 to find prefix matched results using an extended binary search. In alternate embodiments the prefix matcher 310 uses a trie tree approach to find prefix matched results. While trie tree may typically locate a prefix matched result, more memory is required for a trie tree implementation because both a sorted list and the node tree are stored. The nodes in a trie tree each contain a character for matching and a range in the sorted list representing where the character is located. Thus a trie tree implementation causes an extended loading time.

In the illustrated example, the extended binary search employs the sorted list 312 and a comparer 316. The comparer 316 determines how the list is ordered, and the comparer 316 also determines whether the extended binary search shall begin at the top or the bottom of the sorted list 312. The sorted list 312 is maintained for a variety of initial-target language pairs. For example, the sorted list 312 may be alphabetically sorted, stored in Unicode order, or via another sorting mechanism. Thus, for a Unicode sorted, e.g., alphabetical list, an array is formed consistent with the entries shown in Table 1.

TABLE 1

| Array index | Array elements |
|---|---|
| 0 | Ab |
| 1 | Abc |
| 2 | Bc |
| 3 | Ca |
| 4 | Cab |
| 5 | Cabc |
| 6 | Cac |
| 7 | Cacd |
| 8 | Cace |
| 9 | Cacef |
| 10 | Cf |
| 11 | d |

The prefix matcher 310 scans the sorted list, e.g. such as the array of Table 1, and the comparer 316 finds prefix matched results using an extended binary search to locate the first and the last entries in the array that match the input term.

In an alternate embodiment, at 314, prefix matcher recursively matches the input to dictionary entries character-by-character until a wild card character or an unrecognized character is reached, or until matching the input term is completed.

In embodiments where the pattern optimization component has not probed the totality of the input term, when an unrecognized character is reached at 314, e.g., a number, a symbolic character, or a character from an alphabet that is not a part of the initial-target language pair, the input is passed to near miss resolution (NMR) logic 220 to obtain an NMR result shown at 304. When a wild card character is reached at 314, the input and the dictionary entries matched to that point are passed to wild card matcher 318.

When matching the input term is completed at 314, the matched dictionary entries are produced as matched result 114.

When match selector 306 identifies the first character as a wild card at 308, the input is passed to wild card matcher 318. In some embodiments, at 320, the wild card matcher 318 matches the input to dictionary entries using lightweight regular expression parsing, which is discussed in detail with regard to FIG. 4.

In other embodiments, at 320, wild card matcher recursively matches the input to dictionary entries character-by-character until a non wild card character or an unrecognized character is reached. Again, in embodiments where the pattern optimization component has not probed the totality of the input term, when an unrecognized character is reached at 320, the input, and in some instances the dictionary entries matched to that point, is passed to NMR logic 220. When a non wild card character is reached at 320, the dictionary entries matched to that point are filtered on the non wild card character. The dictionary entries that match the non wild card character are retained, and those that lack the non wild card character are discarded. This recursive wild card matching and filtering continues until matching the input term is completed.

When matching the input term is completed at 320, the matched entries are produced as matched result 114. In those instances where multiple sources, e.g., dictionaries 110 and/or databases 112, are searched, preliminary results from the multiple sources are merged to produce the matched result 114.

FIG. 4 is an example lightweight regular expression parsing code snippet for execution by a framework for wild card auto completion according to some implementations. As shown at 402, a match function is defined to take a series of variables assigned descriptive names, as mentioned above, as parameters. The variables include two strings and four integers. One string and two integers are assigned for each of the input term and the dictionary entry. As described above, a string, pattern, represents the input term being matched. Integers patternStartIndex and patternLength represent the character to be parsed first and the length, e.g., number of characters, of the input term, respectively. Meanwhile, a string, dictionary, represents the dictionary entry to which the input term is being compared. Integers dictionaryStartIndex and dictionaryLength represent the character to be parsed first and the length, e.g., number of characters, of the dictionary entry, respectively.

In the match function, as shown at 404, pattern enumeration is finished and matching terminates when patternStartIndex is equal to patternLength, meaning that the end of the input term has been reached. Whether the match function returns "true" (indicating a match to a particular dictionary entry) or "false" (indicating the particular dictionary entry does not match the input term) depends on whether or not the end of the dictionary entry has been reached when the end of the input term has been reached. That is, all of the characters in the dictionary entry have been examined and matched successfully to an input term when dictionaryStartIndex is equal to dictionaryLength.

As shown at 406, when the current character at patternStartIndex is "*", "*" can be matched by any or zero characters the dictionary entry. As shown at 408, when the current "*" character is also the last character of the input term, e.g., when patternStartIndex==patternLength−1, the "*" matches the remaining part of the dictionary entry. However, as shown at 410, if any additional characters follow the wild card "*" in the input term, then multiple characters of the dictionary entry may be examined to determine a candidate set of characters in the dictionary entry that may be matched against the "*" wild card. That is, the first character following the "*" in the input string is identified. If the character immediately following the "*" is a non-wild card character, then at 412, successive characters in the dictionary entry are compared to the character immediately following the "*" in the input term until a match is identified, signifying the end of a string of characters that can be matched to the "*". The match function is then recursively called with the start index values corresponding to the next character in both the input term and the dictionary entry, essentially re-starting the match process from the position following the wild card match.

If the first character following a "*" in the input string is another wild card character, e.g., "?", then at 414, the match function is recursively called to match at least one character from the dictionary entry to the "*?" wild card character combination from the input term.

If no character in the dictionary entry is found to match the character following the wild card character in the input term, then execution of the code returns false as shown at 416.

If the current character in the input string is not a "*" wild card, then at 418, execution of the code returns false if enumeration of the dictionary entry has been completed, but not enumeration of the input term. Thus, the input term is longer than that dictionary entry.

When the current character of the input term is not a wild card and matches the current character of the dictionary entry, the match function is recursively called to examine the next position in the pattern string and the next position in the dictionary string at 420.

When the current character of the input term is the single character wild card, "?", it matches the current character of the dictionary entry, and the match function is recursively called to examine the next position in the pattern string and the next position in the dictionary string at 422. In the event that the current character of the input term does not match the current character of the dictionary entry, execution of the code returns false as shown at 424.

An example call sequence to determine whether the dictionary entry "abcd" matches a user input of "?*d" follows.

1. Call Match(pattern="?*d", patternStartIndex=0, patternLength=3, dictionary="abcd", dictionaryStartIndex=0, dictionaryStartLength=4). The code will go to the statement "else if (pattern[patternStartIndex]=='?')", which is designated in FIG. 4 as 422.
2. Call Match(pattern="?*d", patternStartIndex=1, patternLength=3, input="abcd", dictionaryStartIndex=1, dictionaryStartLength=4). Pattern[1] is "*", so c will be assigned the value of pattern[2]="d". Then the loop for (int k=dictionaryStartIndex; k<dictionaryLength; ++k) starts. When k=1, or 2, both dictionary[1]="b", and dictionary[2]="c" don't match "d". So k reaches 3, dictionary[3]="d"=c, satisfying the condition, "if (c==char.ToUpperInvariant(input[k]))".
3. Call Match(pattern="?*d", patternStartIndex=3, patternLength=3, dictionary="abcd", dictionaryStartIndex=4, dictionaryStartLength=4). Both conditions patternStartIndex==patternLength and dictionaryStartIndex==dictionaryLength are satisfied. So "true" is returned, indicating that "abcd" matches "?*d".

Figure 5:
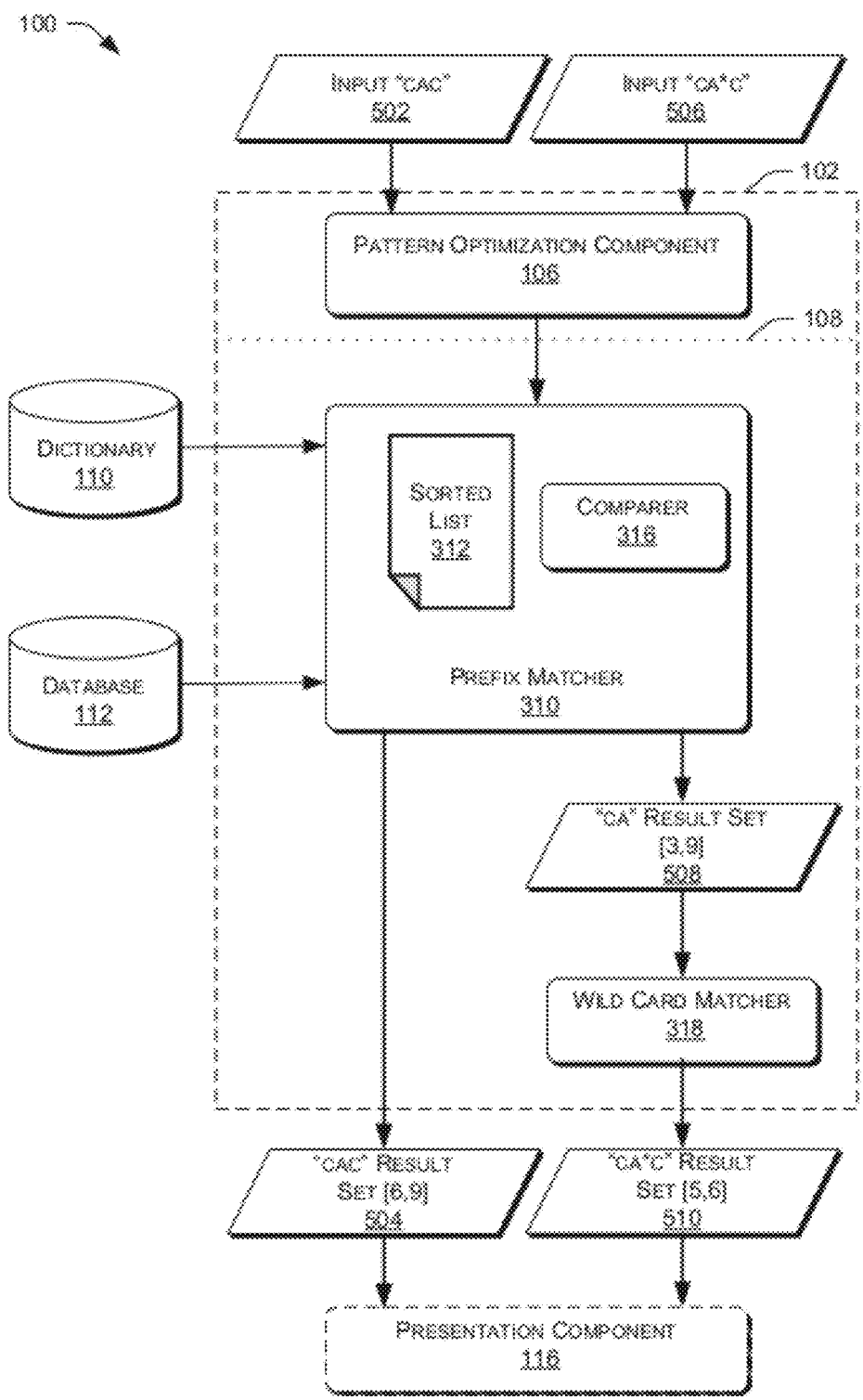
FIG. 5 is a block diagram illustrating additional aspects of an example framework for wild card auto completion.

FIG. 5 illustrates additional aspects of framework 100 that may be implemented via the system 200 illustrated in FIG. 2.

In this embodiment the wild card auto completion component 102 stores entries from a dictionary 110 and/or a database 112 in a sorted list 312 as discussed above. The prefix matcher 310 scans the sorted list 312 to find prefix matched results using a binary search. In the illustrated example, the binary search is controlled by the comparer 316.

The comparer 316 is a string binary operator that is applied to two strings, the individual dictionary entries stored in the array and the current input term. The comparer 316 compares the start of the strings, e.g., if the dictionary entry starts with the input term, then the comparer 316 determines that the dictionary entry equals the input term. Otherwise, the comparer determines which is bigger based on sorted order, e.g., based on the Unicode order.

As an example, if the dictionary entry is "abc" and the input term is "ab", the comparer determines that the dictionary entry is equal to the input term. By comparison, if the dictionary entry is "ab" and the input term is "abc", the comparer will determine that the dictionary entry is less than the input term. Similarly, if the dictionary entry is "ab" and the input term is "bc", the comparer will determine that the dictionary entry is less than the input term.

FIG. 5 illustrates two example inputs. Given an example input term "cac", at 502, the prefix matcher 310 scans sorted list 312 and the comparer 316 uses an extended binary search to find a set of prefix matched results at 504. The extended binary search is performed to detect which is larger between the median entry of the array, e.g., (0+11)/2=5.5 (truncated to 5) and "cac". The comparer 316 compares the array[5], which is "cabc" with the input term "cac" and determines that array[5]<"cac". Another binary search is performed to detect which is larger between the median entry of the range [5, 11] of the array, e.g., (5+11)/2=8 and "cac". The comparer 316 compares the array[8], which is "cace" with the input term "cac" and determines that array[8]="cac".

To find the first entry that matches, another binary search is performed to detect which is larger between the median entry of the range [0, 8] of the array, e.g., (0+8)/2=4 and "cac". The comparer 316 compares the array[4], which is "cab" with the input term "cac" and determines that array[4]<"cac". Another binary search is performed to detect which is larger between the median entry of the range [4, 8] of the array, e.g., (4+8)/2=6 and "cac". The comparer 316 compares the array[6], which is "cac" with the input term "cac" and determines that array[6]="cac".

To find the last entry that matches, another binary search is performed to detect which is larger between the median entry of the range [8, 11] of the array, e.g., (8+11)/2=9.5 (truncated to 9) and "cac". The comparer 316 compares the array[9], which is "cacef" with the input term "cac" and determines that array[9]="cac". Another binary search is performed to detect which is larger between the median entry of the range [9, 11] of the array, e.g., (9+11)/2=10 and "cac". The comparer 316 compares the array[10], which is "cf" with the input term "cac" and determines that array[10]>"cac".

Thus, via this extended binary search in this example, the entries stored in the range of the array[6,9] match the input term "cac" and are returned as the result set at 504. In some embodiments the matched results 504 are passed to presentation component 116.

The following example illustrates an embodiment of the wild card auto completion system of FIG. 5 implementing the prefix matcher 310 with a wild card matcher 318. The prefix matcher 310 employs a sorted list 312 and a comparer 316 performing a binary search for matching 314 while the wild card matcher 318 employs lightweight regular expression parsing such as that shown in the code snippet of FIG. 4 for matching 320. Processing performed by, and aspects included in, wild card auto completion component 102 are illustrated within the dashed line, while items below the dotted line may be included within the matching component 108.

As also illustrated in FIG. 5, given an input term "ca*c" at 506, the pattern optimization component 106 determines that no unrecognized characters are present in the input term, that the term does not begin with a wild card, and that there is only one wild card character. In the embodiment illustrated, the pattern optimization component 106 passes the input term directly to a prefix matcher 310. The prefix matcher performs an extended binary search using "ca" in an array of dictionary entries from a dictionary 110, e.g., sorted list 312. Using the sample array from Table 1, the range of entries in array[3,9] is returned as a prefix matched result set at 508. Wild card matcher 318 performs lightweight regular expression parsing as described regarding FIG. 4 on the prefix matched result set from 508. The lightweight regular expression parsing is performed on each pair, e.g., "ca*c", "ca"; "ca*c", "cab"; "ca*c", "cabc"; "ca*c", "cac"; "ca*c", "cacd"; "ca*c", "cace"; "ca*c", "cacef". Upon completing the parsing for each pair, the entries stored in the range of the array[5,6] "cabc" and "cac" match the input term "ca*c" and are returned as the matched results at 510. In some embodiments the matched results 510 are passed to presentation component 116.

Although the examples illustrated reflect a text/string match, the techniques are extensible to include parameters such as context, domain, parts of speech, and a number of words as discussed above.

Figure 6:
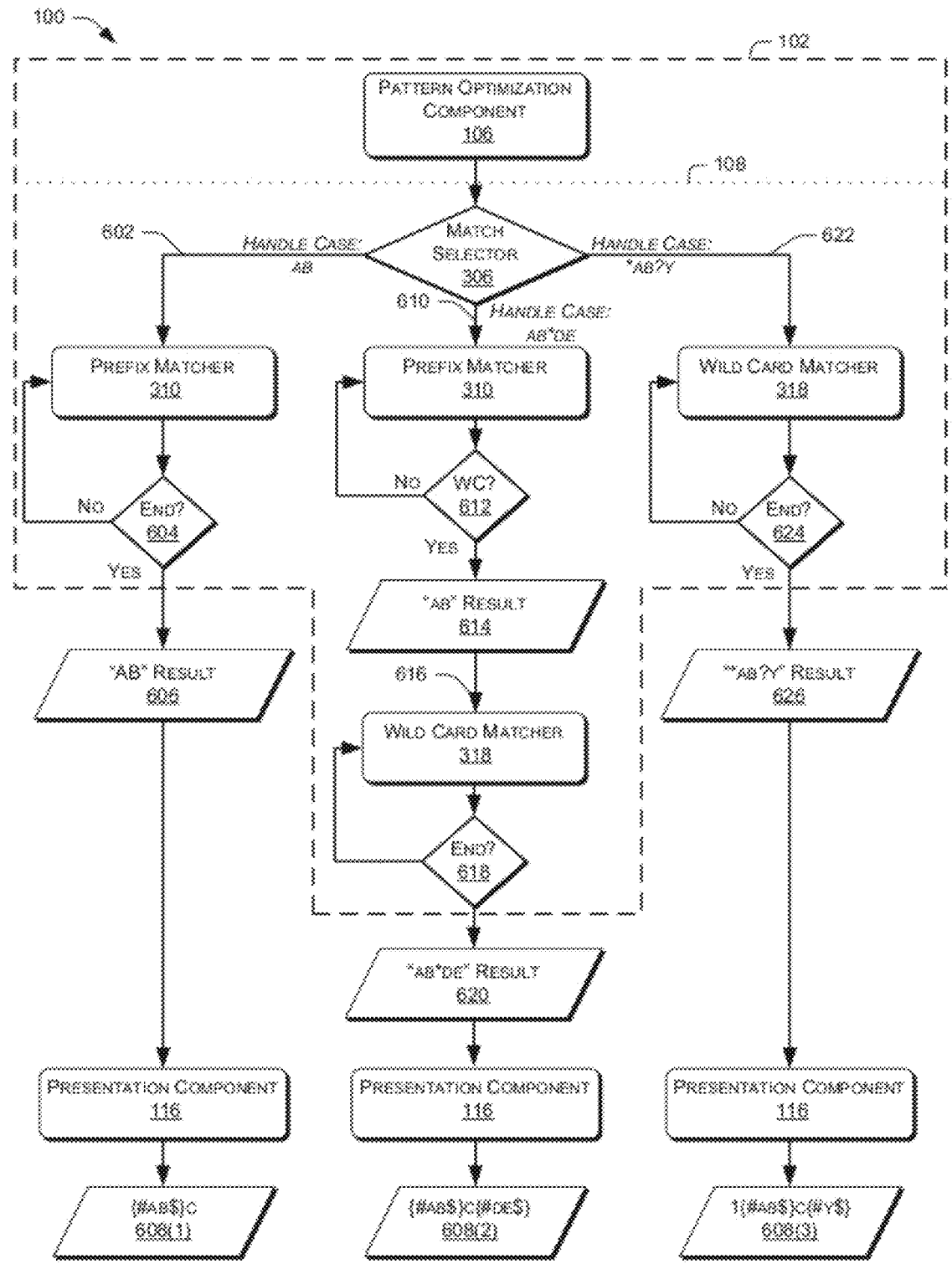
FIG. 6 is another block diagram illustrating additional aspects of an example framework for wild card auto completion.

FIG. 6 illustrates other aspects of framework 100 for wild card auto completion. Processing performed by, and aspects included in, wild card auto completion component 102 are illustrated within the dashed line, while items below the dotted line may be included within the matching component 108. As described with regard to FIG. 6 and elsewhere herein, "AB," "DE," and "Y", for example, can each represent any one or more letters or other non wild card input characters.

As described above, pattern optimization component 106, parses the input as a string. Pattern optimization component 106 optimizes any series of consecutive homogeneous wild card characters in the input term. For example, a series of zero to multi-character wild card characters such as "***" may be optimized to "*" to accelerate wild card auto completion processing, while in a series of non-homogeneous wild card characters, "?*" or "*?" for example, the number of "?" wild card characters in the series dictates a minimum length of characters that will match the wild card character. Thus, for "?*?" the minimum length of letters or characters returned to match the wild card series is two, up to any number, instead of zero to any number.

In some embodiments, match selector 306, which is a part of matching component 108, recursively analyzes each character of the input term. The illustrated cases are merely examples, and in other examples an asterisk, "*", which means zero to any number of characters, may replace a question mark, "?", which means exactly one character and vice-versa.

If the input term matches a pattern of "AB", such that the first character is not a wild card, the match selector 306 assigns the input term to path 602. In some embodiments a prefix matcher as described regarding FIG. 5 is employed, while in other embodiments each character may be recursively processed by prefix matcher 310. At 604, whether the end of the input string has been reached is determined. When the input string does not include a wild card, the case of "AB" applies. In other words, an input string may be entered without a wild card. In some instances an entry without a wild card may be treated as though a "*" wild card had been entered in the last or trailing position. In addition, if "AB" is followed by the wild card character, "?", then only prefix matches of the pattern "AB?" and pattern length of AB+1, e.g., 3, characters will be returned. Note, an input term may include a series of single wild card characters, e.g., "???", which will dictate the pattern length. Moreover, if "AB" is followed by the wild card character, "*", then any prefix matches of the pattern "AB*" and any length will be returned. When the end of the input term is reached, matching component 108 produces a prefix matched result, for example, "AB" result as shown at 606. The prefix matched result 606 on path 602 is forwarded to presentation component 116. Although illustrated separately for clarity, a single presentation component 116 may perform presentation refinement for the variety of input cases.

In various embodiments presentation component 116 includes a marking component that tags the letters or characters in the result that match the letters or non wild card characters from the received input term to contrast with letters or characters in the result that match any wild cards in the input term. In addition, presentation component 116 may rank or group the results by context or domain and according to popularity or input errors as discussed above. Marked results 608 provide an example syntax for the marking of the matched results. In the illustrated syntax, a left bracket followed by a "#" sign signifies the beginning of a character or series of characters that were a part of the input term and a "$" sign followed by a right bracket signifies the end character or series of characters that were part of the input term. Any characters outside of the brackets represent a character or series of characters matched to a wild card character from the input term. On path 602, marked result 608(1) illustrates the example of a result matched to an input term of "AB*" or "AB?", with the "C" outside the right bracket indicating that the "C" was matched to the wild card portion of the input term.

The results returned will include all dictionary entries that match "AB" with zero to any additional characters in the respective dictionary entries.

If the input term matches a pattern of "AB*DE" such that the first character is not a wild card, but the input term includes at least one wild card followed by other non wild card characters, the match selector 306 assigns the input term to path 610, and each input character is recursively processed by prefix matcher 310 until a wild card character is reached.

At 612, whether a wild card character has been reached is determined. When the input term does not start with a wild card but includes at least one wild card, the case of "AB*DE" applies. If, for example, the letters "AB" and "DE" were actual letters of an input term, rather than example placeholders representing one or more characters, the pattern "AB*DE" would have a length of 5 input characters while it could match dictionary entries of 4 to infinity characters based on the "*" representing zero to any number of characters. In addition, if "AB" were followed by the wild card character, "?", then prefix matches of the pattern "AB?DE" and length of AB+1+DE, e.g., 5, characters will be obtained as a prefix matched result 614 on path 610. In contrast, when considering the letters "AB" and "DE" example placeholders representing one or more characters, the pattern "AB*DE" would have a length of at least the number of input characters while it could match dictionary entries of the number of input characters to infinity characters based on the "*" representing zero to any number of characters. In addition, if "AB" were followed by the wild card character, "?", then prefix matches of the pattern "AB?DE" and length the number of input characters plus one will be obtained as a prefix matched result 614 on path 610.

On path segment 616, the prefix matched result 614 on path 610 is forwarded to wild card matcher 318. Note, an input term may include a series of single wild card characters, e.g., "??", which will dictate the pattern length. Moreover, if "AB" is followed by the wild card character, "*", then any prefix matches of the pattern "AB*DE" and any length will be returned at 614 on path 610. In some instances prefix matcher 310 stores a prefix matched result such as "AB" RESULT shown at 614. In some embodiments a prefix matcher as described regarding FIG. 5 is employed, while in other embodiments, this process is repeated until the prefix matcher 310 reaches the end of the input string or encounters a wild card or an unrecognized character in the start index.

Wild card matcher 318, in turn, employs a lightweight regular expression engine as described regarding FIG. 4 and filters the prefix matched results based on the wild card character(s) and the non wild card characters that follow the wild card character(s) in the input term, e.g., "*DE". Moreover, the input term may contain multiple wild card characters, which may be of diverse types, separated by zero or more non wild card characters in the input term. When the input term contains multiple wild card characters separated by one or more non wild card characters in the input term (not shown), the wild card matcher recursively filters the results based on the non wild card characters that follow each of the successive instances of wild card characters in the input term.

At 618, when the end of the input term is reached, matching component 108 produces a wild card matched result, for example, "AB*DE" RESULT 620 as shown. Wild card matched result 620 is forwarded to presentation component 116.

Presentation component 116, for example, includes a marking component that tags the characters that matched the non wild card characters from the received input term "AB" and "DE" to contrast with characters that were matched to the wild card characters by the wild card matcher in result 618. In addition, presentation component 116 may rank or group the results by context or domain and according to popularity or input errors as discussed above. Marked results 608(2) illustrate the syntax for marking the ordered matched results.

If the input term matches a pattern of "*AB" such that the first character is a wild card, the match selector 306 assigns the input term to path 622.

When the input term starts with a wild card, it may include additional instances of multiple, predefined, diverse wild cards, such that the case of "*AB?Y" or "*AB*Y" applies. In this example "Y" indicates that the input string may, but need not include at least one non wild card input character that follows a second wild card character. In other words, path 622 applies when the input term starts with a wild card character and has another, non-consecutive wild card character. Note, the initial wild card in the input term may be a single wild card character, e.g., "?AB*Y", or a zero to multiple character wild card, e.g., "*AB?Y". When the initial wild card character is a single wild card character or there are a series of single wild card characters, the single wild card characters determine the length of wild card matches preceding the input characters "AB"; whereas when a wild card preceding the input characters is a zero to multi-character wild card character, any length of wild card match applies.

In the case illustrated at path 622, wild card matcher 318 filters dictionary entries to locate those with the input characters "AB", and in some instances may cause these filtered entries to be stored (not shown). When matches are found, based on the pattern "*AB?Y", which, in the example instances that "AB" and "Y" represent two and one character, respectively dictates the pattern length for the portion "AB?Y", as AB+1+Y, i.e., a length of 4, wild card matcher 318 again filters the entries to locate those with the input characters "AB" followed by a single character followed by "Y". On the other hand, when matches are found, based on the pattern "*AB*Y", no pattern length is dictated for the portion "AB*Y". Wild card matcher 318 again filters the dictionary entries to locate those with the input characters "AB" followed by zero or any number of characters followed by "Y".

When the end of the input term is reached at 624, matching component 108 produces a wild card matched result, for example, "*AB?Y" RESULT 626. The wild card matched result 626 is forwarded to presentation component 116.

Presentation component 116 includes a marking component that tags the letters or characters in the result that match the "AB" and "Y" from the input string to contrast with letters or characters identified by the wild card matcher as matching the wild cards in the input string. In addition, presentation component 116 may rank or group the results by context or domain and according to popularity or input errors as discussed above. Marked results 608(3) illustrate the syntax for marking the matched results.

Example Operation

An example of the system 200 in operation can be illustrated by the following scenario. When the wild card auto completion service 202 launches, or as directed by language selection logic 208, a word list is loaded into memory from a dictionary 110. Say, for example, that the word list contains the entries flat fish, flying fish, fall fish, fiddle fish, batfish, octopus, flat cell. When the word list is loaded in memory, the words are stored in alphabetical order with a number as the index term in an array, e.g., O-batfish, 1-fall fish, 2-fiddle fish, 3-flat cell, 4-flat fish, 5-flying fish, 6-octopus.

Upon receiving a user input of the term "fl* fish", the wild card auto completion service 202 seeks a match for terms starting with "fl" by using a particular extended binary search algorithm on the sorted list. The particular extended binary search algorithm finds the first matched entry and the last matched entry. The wild card auto completion service 202 returns a range of entries from the first matched entry to the last matched entry as a result collection. In this example, the result collection would include the entries flat cell, flat fish, and flying fish.

The wild card auto completion service 202 continues to seek entries from the result collection that match "fl* fish". The regular expression engine logic 214 proceeds as a lightweight regular expression engine pair-by-pair to compare "flat cell" with "fl* fish", "flat fish" with "fl* fish", and "flying fish" with "fl* fish". In this example, the lightweight regular expression engine logic 214 produces "flat fish" and "flying fish" as result entries, and the result entries are passed to presentation logic 216. In this example, presentation logic 216 includes marker logic that marks or tags the letters "fl" and "fish", which were provided in the input term to enhance presentation via various user interface applications. For example, based on the marking, any letter between the tags "{#}" and "$}" is emphasized in the user interface. In this example, presentation logic 216 produces a result array of [{#fl$} at {#fish$}, {#fl$}ying {#fish$}] enabling the letters "fl" and "fish" provided in the input term to be contrasted with the letters matched to the wild card character, "*".

Figure 9A:
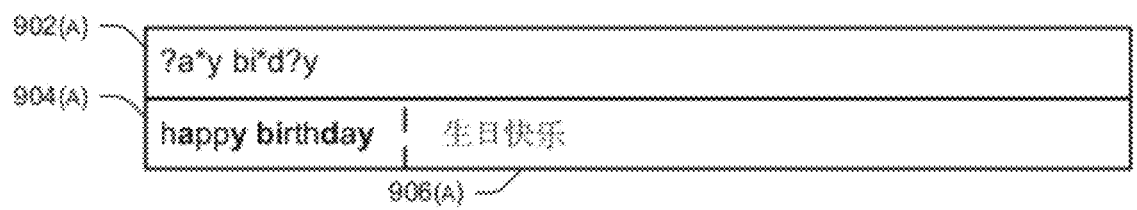
Figure 9B:
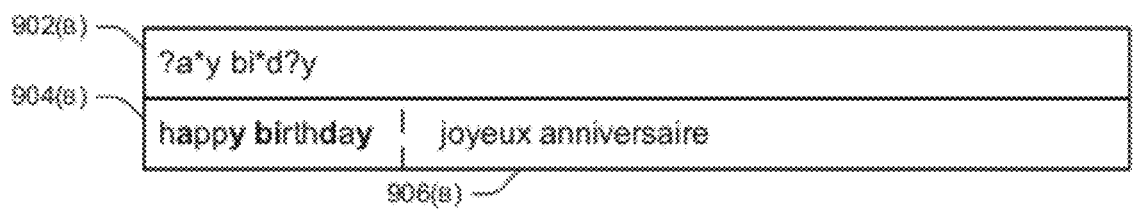

FIGS. 7A, 7B, 8A, 8B, 9A and 9B are examples of user interface presentations for wild card auto completion according to various implementations. The examples shown at FIGS. 7A, 8A, and 9A represent wild card auto completion for a Chinese-English initial-target language pair, while FIGS. 7B, 8B, and 9B represent wild card auto completion for a French-English initial-target language pair. As described above with reference to FIGS. 1 and 2, techniques of wild card auto completion are performed to obtain matched entries responsive to receiving input that may contain multiple, predefined, wild card characters and/or multiple words. Systems of wild card auto completion may also serve as a learning tool for language students.

In the examples shown at 702(A) and 702(B) the input "ha*e" includes one wild card character, "*", in the third position. In this example, the "*" represent a zero to multi-character wild card. Thus, in accordance with the respective selected initial-target language pairs, system 200 produces a list of matches 704(A) and 704(B). System 200 produces the lists by following the path 610 shown in FIG. 6, e.g., by applying a prefix matcher 310 to the input characters "ha" and a wild card matcher 318 to match the pattern "ha*e" to the prefix matched result 614. Thus, the lists at 704(A) and 704(B) each represent a list of results consistent with results 620. In addition, presentation logic 216 may control refinement of additional information to enhance the user experience. In the illustrated example, a definition of the dictionary entries matched to the input term is presented in the initial language next to each returned match as shown at 706(A) and 706(B), right of the dashed line. Definitions facilitate learning and user selection of an appropriate match. In some instances, the results may be reordered, ranked, or grouped by context or domain and according to popularity or input errors as discussed above. In addition, when multiple queries are to be run against multiple sources, e.g., dictionaries 110 and/or databases 112, the preliminary results are merged to produce lists 704 and refined information like the definitions shown at 706. Any number of matched results may be returned in the list, depending on the dictionary entries identified by the wild card auto completion component 102.

In the examples shown at 802(A) and 802(B), the input "c?k?" includes one wild card character, "?", in both the second position and the fourth positions. In this example, the "?" represents a single-letter or single-character wild card.

Thus, in accordance with the respective selected initial-target language pairs, system 200 produces a list of matches 804(A) and 804(B). Again, system 200 produces the lists by following the path 610 shown in FIG. 6, e.g., by applying a prefix matcher 310 to the input letter "c" and a wild card matcher 318 to match the pattern "c?k?" to the prefix matched result 614. Thus, the lists at 804(A) and 804(B) each represent a list of results consistent with results 620, although the single-character wild card is represented rather than the zero to multi-character wild card illustrated in 618. Again, a definition of the entries matched to the terms is presented in the initial language next to each returned match as shown at 806(A) and 806(B), right of the dashed line, although other enhancements are supported. In some instances, the results may be refined by reordering, ranking or grouping by context or domain and according to popularity or input errors as discussed above. In addition, when multiple queries are to be run against multiple sources, e.g., dictionaries 110 and/or databases 112, the preliminary results are merged to produce lists 804 and refined information like the definitions shown at 806. Any number of matched results may be returned in the list depending on the entries identified by the wild card auto completion component 102 in dictionaries 110.

In the examples shown at 902(A) and 902(B) the input "?a*y bi*d?y" includes a wild card character of the, "?", in the first position, a wild card character of the, "*", in the third and eighth positions, with another wild card character of the, "?", in the tenth position. As in the examples described above, the "*" wild card character is a zero to multi-character wild card type, and the "?" wild card character is a single-character wild card type.

Thus, in accordance with the respective selected initial-target language pairs, system 200 produces a list of matches 904(A) and 904(B). In this instance, system 200 produces the lists by following the path 620 shown in FIG. 6, e.g., by recursively applying a wild card matcher 318 to match the pattern "?a*y bi*d?y" of the input term to dictionary entries. Thus, the lists at 904(A) and 904(B) each represent a list of results consistent with results 626. In addition, an example definition, which in this instance represents a translation of a dictionary entry matched to the two words of the input term, is presented in the initial language next to the returned match as shown at 906(A) and 906(B), right of the dashed line. Although any number of matched results may be returned in the list depending on the entries identified by the wild card auto completion component 102 in dictionaries 110, in this instance only one matched result is returned. In instances where multiple matched results are returned, the results may be reordered or ranked or grouped by context or domain and according to popularity or input errors as discussed above. In addition, when multiple queries are run against multiple sources, e.g., dictionaries 110 and/or databases 112, the preliminary results are merged to produce lists 904 and refined information like the definitions shown at 906.

As shown in FIGS. 7A, 7B, 8A, 8B, 9A and 9B, the matched results shown in lists 704, 804, and 904, may be refined for presentation. In the illustrated example, the results in lists 704, 804, and 904 are tagged so that letters in the results that match the non wild card portions of the input may be contrasted with letters matched to wild cards. Although the illustrated example shows the input letters in bold, in various embodiments the letters may be a contrasting color or otherwise emphasized.

In addition, the enhanced inline information shown at 706, 806, and 906, for example, may be user configurable to represent a short, e.g., one line, translation, synonym, or definition of the dictionary entries or database entries matched to the input term, and may be presented in the initial language or a user selected language. In some instances, the definitions returned may change over time, such as after the dictionaries 110 are updated and may be obtained from multiple sources including databases 112. In another aspect, a user may configure the system to replace or augment the definitions with examples of the matched results used in context, e.g., in a phrase or sentence. In yet another aspect, a user may configure the system to reorder, rank, or group the results by context or domain and according to popularity or input errors as discussed above.

Example Process

Figure 10:
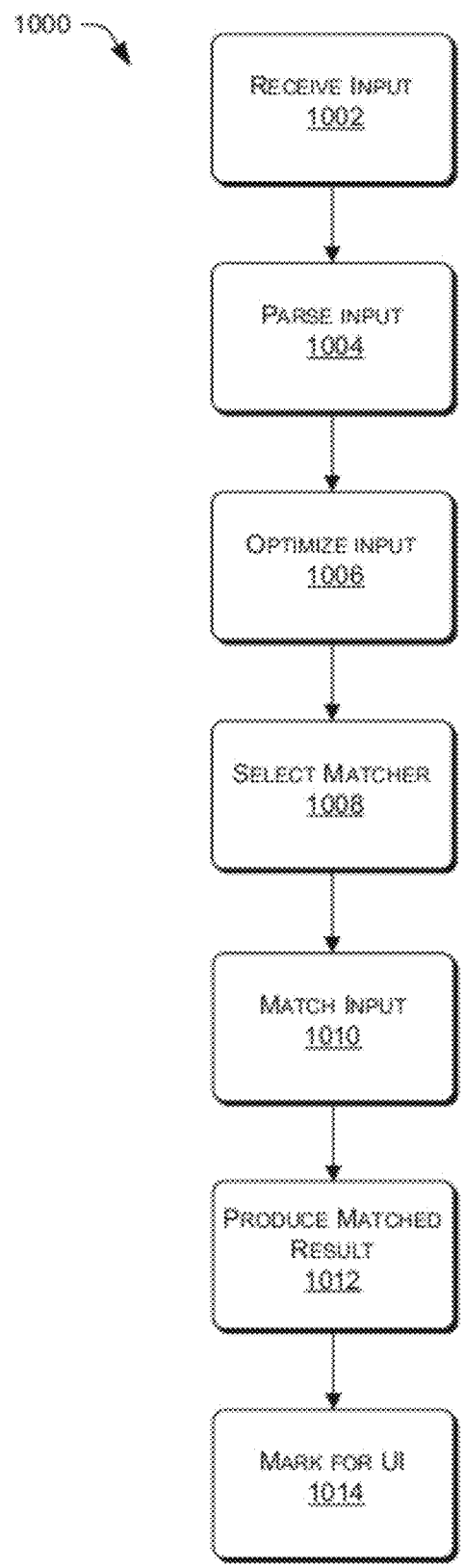
FIGS. 10 and 11 are flow diagrams showing illustrative processes of wild card auto completion.
Figure 11:
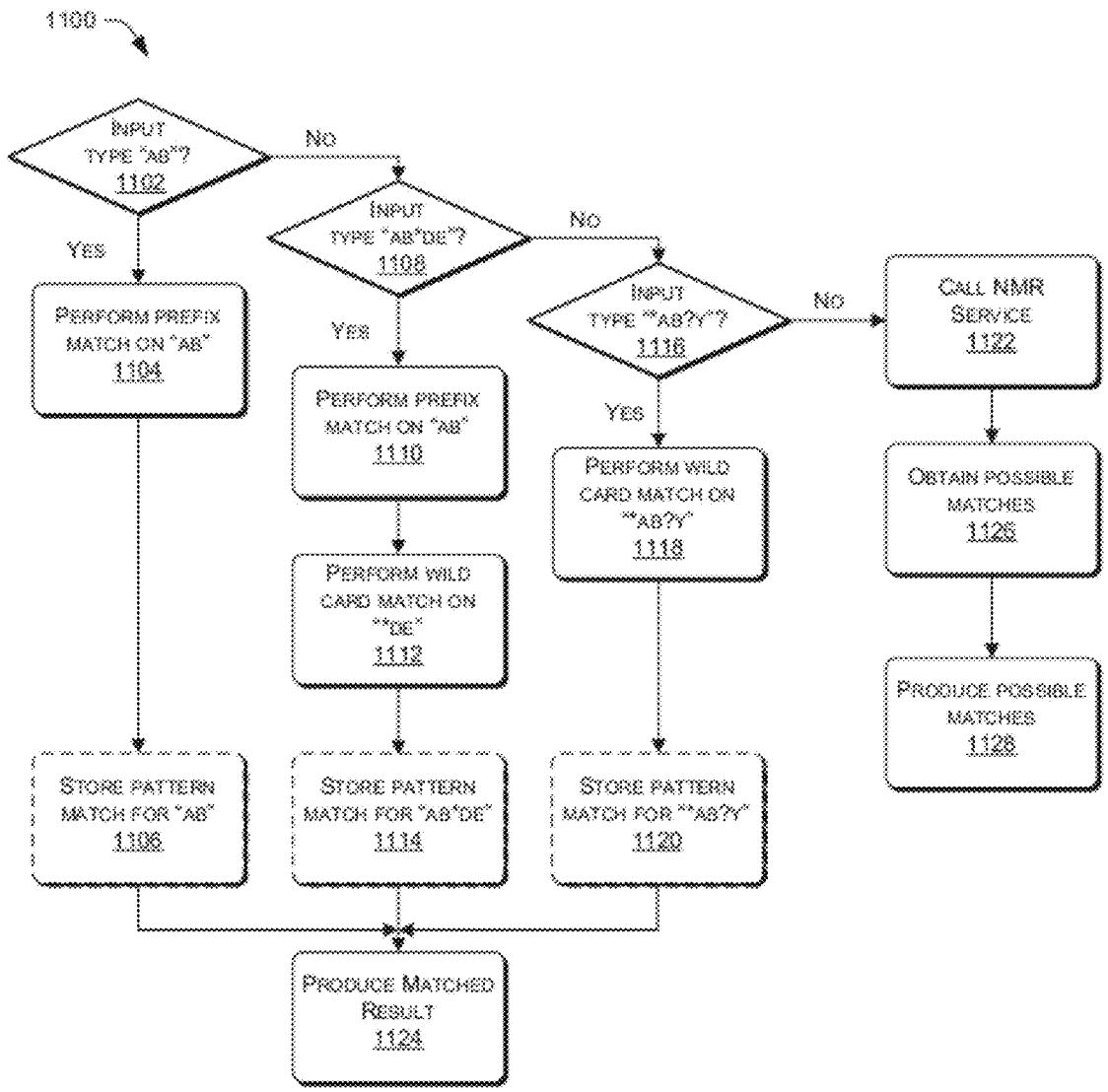

FIGS. 10 and 11 show illustrative processes 1000 and 1100 as performed by system 200 of FIG. 2 for wild card auto completion. These processes are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Note that the order in which the processes are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, while these processes are described with reference to the framework 100 of FIGS. 1, 3 5, and 6 and the system 200 of FIG. 2, other architectures may implement these processes in whole or in part.

At 1002, the wild card auto completion component 102 receives an input term which may represent one or more words. In various implementations, wild card auto completion service 202 is configured to receive a request 206 at various levels of granularity. For example, wild card auto completion service 202 may be configured to receive various initial-target language pairs as well as input 104 including context, domain, part of speech, and a number of words. Input 104 may include an input term made up of one or more partial words with wild cards, a single word, or multiple words, (which in some instances may include one or more words in the initial language), as a part of request 206.

At 1004, wild card auto completion component 102 parses the received input term to identify a pattern of the input term. For example, regular expression engine logic 214 as a lightweight regular expression engine identifies one or more wild card characters, their type, and their location in the input term.

At 1006, pattern optimization component 106 of wild card auto completion component 102 employs pattern optimization logic 210 performs optimization as discussed above. For example, pattern optimization component 106 optimizes any series of consecutive homogeneous wild card characters in the input term, e.g., a series of zero to multi-character wild card characters such as "***" is optimized to "*" to accelerate wild card auto completion processing. In addition, pattern optimization component 106 may optimize a pattern based on recognizing a part of speech, context, domain, and/or a number of words for the result identified as part of the input term.

At 1008, wild card auto completion component 102, including regular expression engine logic 214, matching component 108, matching logic 212, and/or match selector 306, selects a matcher, e.g., prefix matcher 310 and/or wild card matcher 318, which corresponds to the input term having an optimized pattern identified in 1006. For example, for an input term such as that shown at 802, wild card auto completion component 102 selects prefix matcher 310 initially in accordance with path segment 610 and subsequently selects wild card matcher 318 in accordance with path segment 616 as discussed above.

At 1010, wild card auto completion component 102, including regular expression engine logic 214, matching logic 212, and/or matching component 108, matches the input term to one or more entries from selected dictionaries 110 and/or databases 112. For example, in response to a request 206, one or more components of wild card auto completion 202, such as language selection logic 208, access entries, such as translations, synonyms, and/or definitions, from dictionaries 110. At 1010, the accessed entries are matched by the matcher selected at 1008 to the input term 104.

At 1012, wild card auto completion component 102 including wild card auto completion service 202 produces a matched result such as those shown at 606, 620, and 626. In some instances, the matched result produced at 1012 may be provided to web server logic 218 for further processing or may be provided directly to viewer 204. In other instances the matched result may be provided to presentation logic 216 for refinement or enhancement.

At 1014, wild card auto completion service 202, including presentation logic 216 and/or presentation component 116 may refine the matched results as discussed above. For example, when a marking component of presentation component 116 employs marking logic of presentation logic 216, the matched results are marked or tagged to emphasize the non wild card input characters or letters in contrast to the wild card matched letters or characters to enhance presentation via a user interface (UI).

FIG. 11 shows another example process 1100 for wild card auto completion, which in some instances corresponds to blocks 1008-1012 of FIG. 10. Although described using several pattern that were introduced earlier for ease of understanding, one of skill in the art will recognize that other described pattern scenarios may also be applied. Such other pattern scenarios include but are not limited to a number of words indicated for the matched results, a part of speech, context, and/or domain.

At decision block 1102, wild card auto completion service 202 determines whether an input term such as input 104 is of a pattern type corresponding to "AB" such as represented by path segment 602 of FIG. 6. When the answer is yes, processing proceeds to block 1104 where a prefix match is performed on the input term such as by prefix matcher 310. At block 1106, a pattern match may be stored. However, when the answer is no, processing proceeds to 1108.

At decision block 1108, wild card auto completion service 202 determines whether an input term, such as input 104, is of a pattern type corresponding to "AB*DE" such as represented by path segment 610 of FIG. 6. When the answer is yes, processing proceeds to block 1110 where a prefix match is performed on the input term such as by prefix matcher 310. A wild card match is then performed at block 1112 such as by wild card matcher 318 represented on path segment 616. At block 1114, a pattern match may be stored. However, when the answer at block 1108 is no, processing proceeds to block 1116.

At decision block 1116, wild card auto completion service 202 determines whether an input term such as input 104 is of a pattern type corresponding to "*AB?Y" such as represented by path segment 622 of FIG. 6. When the answer is yes, processing proceeds to block 1118 where a wild card match is performed on the input term such as by wild card matcher 318. At block 1120, a pattern match may be stored. However, when the answer at block 1116 is no, processing proceeds to block 1122. Processing may proceed to block 1122, for example, when a first character is not one of the multiple, predefined, wild cards and not alphabetical or a part of the initial language. For example, processing may proceed to block 1122 when the request is for an initial/target language pair of English and French and a Han script character is the first character of the input term. As another example, processing may also proceed to block 1122 when a number is input as the first character.

When wild card auto completion service 202 affirmatively determines a pattern type of an input term at decision blocks 1102, 1108, and/or 1116, the processing described above, which may be performed recursively until the input term is fully processed produces a matched result at block 1124.

Although a negative determination at decision block 1116 may cause an error and termination of the wild card auto completion service 202 in some instances, in others, where wild card auto completion service 202 includes fuzzy matching integration, at 1122 a near-miss resolution (NMR) service having near miss resolution logic 220 may be called. In various embodiments the NMR service may be included in wild card auto completion service 202. Such an NMR service may employ various machine learning and natural language processing techniques to obtain possible matches 1126 that are not recognized by the other processes described regarding wild card auto completion. In the event that an NMR service is called, possible matches 1126 may be produced at 1128. In at least one embodiment, possible matches produced at 1128 may be forwarded for marking for a user interface (UI) as described regarding 1014.

As noted above, the order in which the processes have been described is not intended to be construed as a limitation, and any number of the described process blocks can be combined in any order to implement the processes, or alternate processes. Additionally, individual blocks or processes may be deleted without departing from the spirit and scope of the subject matter described herein. For example, in at least one embodiment, process 1100 as discussed regarding FIG. 11, is performed independently of process 1000, as discussed regarding FIG. 10. However, in other embodiments, performance of the processes 1000 and 1100 may be incorporated in, or performed in conjunction with, each other.

Example Operating Environment

Figure 12:
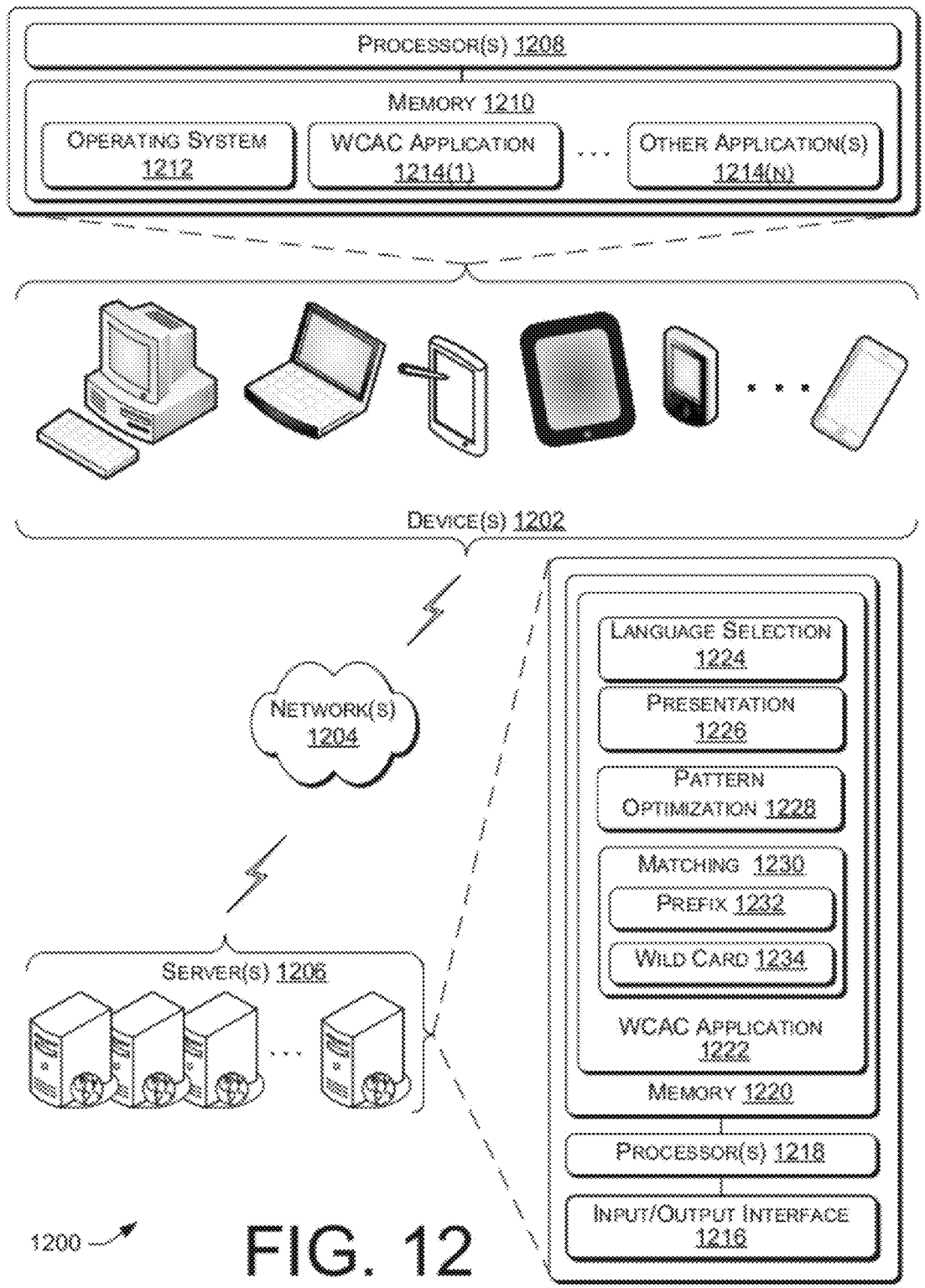
FIG. 12 is a pictorial representation of an illustrative operating environment and an example architecture including a hardware and logical configuration of a computing device.

FIG. 12 is a pictorial representation of an illustrative operating environment 1200 including an example architecture having a hardware and logical configuration of a computing device according to some implementations of wild card auto completion. The environment described constitutes but one example and is not intended to limit application of the system described above to any one particular operating environment. Other environments may be used without departing from the spirit and scope of the claimed subject matter. The various types of processing described herein may be implemented in any number of environments including, but not limited to, stand alone computing systems, network environments (e.g., local area networks or wide area networks), peer-to-peer network environments, etc. FIG. 12 illustrates a variety of devices and components that may be implemented in a variety of environments in which wild card auto completion may be implemented.

The environment 1200 may include a variety of devices 102 that, via a network 1204, provide wild card auto completion data to other computing devices including server(s) 1206. As illustrated, a device 1202 includes one or more processors 1208 and memory 1210, which may include an operating system 1212, and one or more applications, including a wild card auto completion (WCAC) application 1214(1) and other applications 1214(N), running thereon.

In various embodiments, devices 1202 are embodied as a variety of computing devices such as a desktop computer, a personal computer, a laptop-style personal computer, a personal digital assistant (PDA), a smart phone, a multi-function mobile device, a thin client, a netbook computer, a tablet computer, a mobile telephone, a set-top box, a portable music player or any other sort of suitable computing device, (not all of which are shown). Devices 1202 may also include servers such as a server 1206.

Devices 1202 and/or servers 1206 may include communication interfaces for exchanging data with other devices, such as via a network, direct connection, and so forth. The communication interfaces can facilitate communications within a wide variety of networks 1204 according to multiple protocol types, including wired networks (e.g., LAN, cable, etc.) and wireless networks (e.g., WLAN, cellular, satellite, etc.), the Internet and the like, which are not enumerated herein. Devices 1202 and/or servers 1206 may also include at least one display device, which may be any known display device such as an LCD or CRT monitor, television, projector, touch screen or other display or screen device. Devices 1202 and/or servers 1206 may also include input/output devices, which may include a mouse and a keyboard, a remote controller, a camera, microphone, a joystick, and so forth. Furthermore, devices 1202 and/or servers 1206 may also include output devices, such as speakers, printers, and the like that are able to communicate through a system bus or other suitable connection, which are not enumerated herein. The memory 1210, meanwhile, may include computer-readable storage media.

Computer-readable storage media includes, but is not limited to computer-readable storage media for storing instructions such as computer readable instructions, data structures, program modules, or other data, which are executed by processors to perform the various functions described above. For example, computer-readable storage media may include memory devices, such as volatile memory and non-volatile memory, and removable and non-removable media implemented in any method or technology for storage of information. Further, computer-readable storage media includes, but is not limited to, one or more mass storage devices, such as hard disk drives, solid-state drives, random access memory (RAM), read only memory (ROM), electrically erasable programmable read-only memory (EEPROM), removable media, including external and removable drives, memory cards, flash memory, floppy disks, optical disks (e.g., CD-ROM, digital versatile disks (DVD) or other optical storage), magnetic cassettes, magnetic tape, magnetic disk storage or other magnetic storage devices, storage arrays, storage area networks, network attached storage, or any other medium or combination thereof that can be used to store information for access by a computing device.

Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module" or "component" can represent program code (and/or declarative-type instructions) for performing specified tasks or operations when executed on a processing device or devices (e.g., CPUs or processors). The program code can be stored in one or more computer-readable memory devices or other computer-readable storage devices. Thus, the processes, logic and modules described herein may be implemented by a computer program product.

Although illustrated in FIG. 12 as being stored in memory 1210 or 1220, modules 1214(1) and/or 1222, or portions thereof, may be implemented using any form of computer-readable media that is accessible by devices 1202 and/or 1206. Computer-readable media may include, for example, computer-readable storage media as described above and communications media. Computer-readable storage media is configured to store data on a tangible medium, while communications media is not.

In contrast to the computer-readable storage media mentioned above, communication media may embody computer readable instructions, data structures, program modules, or other data in a modulated data signal, such as a carrier wave, or other transport mechanism.

Operating system 1212 may further include other operating system components, such a user interface component, a kernel, and so forth. Additionally, operating system 1212 may include a system API for use by the WCAC application 1214(1) in collecting user interaction information, system information, and other language information telemetry in accordance with the implementations described herein. Further, memory 1210 may include other modules, such as device drivers, and the like, as well as other data, such as data used by other applications 1214(N). The modules described in the context of FIG. 12, represent instructions for a processor executing the logic of FIG. 2 to be configured equivalent to the components described with regard to FIGS. 1, 3, 5, and 6. In at least one embodiment, the WCAC application 1214(1) comprises, or has access to, a browser, which is a module, program, or other entity capable of interacting with a network-enabled entity. In addition, in other implementations, WCAC application 1214(1) may be included as a component of operating system 1212 and/or may be a component of another application, or the like.

The applications 1214(1)-(N) may comprise desktop applications, web applications provided over a network such as network 1204, and/or any other type of application capable of running on the device 1202. The network 1204, meanwhile, may represent a combination of multiple different types of networks, interconnected with each other and functioning as a single large network (e.g., the Internet or an intranet). The network 1204 may include wire-based network components (e.g., cable) and wireless network components (e.g., cellular, satellite, etc.).

Servers 1206 may include, for example, a web server, a server farm, a content server, and/or content provider(s). In various implementations, modules containing components and logic for processing as discussed above with reference to FIGS. 1-11 may be implemented in any number of combinations across any number of the servers 1206 and computing devices 1202 shown in FIG. 12. For example, in various embodiments, results may be served by, or requested from, one or more dictionaries 110 and/or databases 112 housed on various servers 1206.

A server 1206 includes an input/output interface 1216 coupled to one or more processors 1218 and memory 1220, which, in addition to an operating system (not shown) may include a WCAC application module 1222 including a language selection module 1224 and a presentation module 1226. In accordance with wild card auto completion as described herein, WCAC application module 1222 may include a pattern optimization module 1228 and a matching module 1230. Meanwhile, the matching module 1230 may include a prefix matching module 1232 and a wild card matching module 1234 that employs a regular expression engine. Other applications (not shown) may also run on server 1206. In addition, memory 1220 may include computer-readable storage media as discussed above. The modules in memory 1220 may correspond to and implement the components, logic, and programming code described in FIGS. 1-6.

Processors 1208 and 1218 may each be a single processing unit or a number of processing units, all of which may include single or multiple computing units or multiple cores. The processors 1208 and 1218 can be implemented as one or more microprocessors, microcomputers, microcontrollers, digital signal processors, central processing units, state machines, logic circuitries, and/or any devices that manipulate signals based on operational instructions. Among other capabilities, the processors 1208 and 1218 can be configured to fetch and execute computer-readable instructions stored in memory 1210 or 1220, or other storage media.

Other storage media may include computer-readable storage media for storing instructions such as computer readable instructions, data structures, program modules, or other data, which are executed by the processors 1208 or 1218 to perform the various functions described above. For example, other storage media may generally include any of the technologies of computer-readable media described above or combinations thereof that can be used to store information for access by a computing device.

Thus, storage media may be collectively referred to as memory or computer-readable storage media herein. Computer-readable storage media is capable of storing computer-readable, processor-executable program instructions as computer program code that can be executed on a processor such as processors 1208 or 1218 to configure a device as a particular machine for performing the operations and functions described in the implementations herein.

Although they are not individually shown in FIG. 12, memory 1220 may include components and/or modules embodying logic described with regard to FIG. 2, which can be executed on the processor 1218 for implementing the wild card auto completion functions and algorithms described herein. WCAC application module 1222 corresponds to wild card auto completion component 102 and wild card auto completion service 202 discussed above, such as with respect to FIGS. 1 and 2, and may include a pattern optimization module 1228 corresponding to pattern optimization component 106 and pattern optimization logic 210, as well as matching module 1230 corresponding to matching component 108 and matching logic 212. In addition, while language selection module 1224 corresponds to language selection logic 208, presentation module 1226 corresponds to presentation component 116 and presentation logic 216. Meanwhile, matching module 1230 may include modules that correspond to components and logic such as prefix module 1232 corresponding to a prefix matcher 310 and wild card module 1234 corresponding to regular expression engine logic 214 and wild card matcher 318. In addition, memory 1220 may include an operating system, which is not shown in FIG. 12 for clarity.

The example environments, systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation or embodiment, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

We claim:

1. A method comprising:
accepting a request to a wild card auto completion service including an input term at least partly in a target language and at least partly in an initial language, wherein the initial language and the target language are two different languages, the service employing a syntax to accept the input term including zero to multiple wild card characters in the target language or in the initial language in a first part and a delimiter indicating a second part, the second part comprising the target language or the initial language such that: if the language of the first part includes the initial language, the second part includes the target language and if the language of the first part includes the target language, the second part includes the initial language, and the second part identifying at least one of a context or a domain for the wild card auto completion service;
identifying an initial-target language pair for the request;
aggregating two or more consecutive homogenous wild card characters, wherein the aggregating comprises replacing the two or more consecutive homogenous wild card characters with a single wild card character of a same type as the homogenous wild card character;
parsing the input term to identify a pattern of the input term;
selecting a matcher corresponding to the pattern of the input term;
matching the input term to an entry using the matcher selected; and
returning the entry.

2. A method as recited in claim 1, wherein the input term includes more than one word.

3. A method as recited in claim 1, wherein the input term includes multiple words and one of the multiple words is input in the initial language.

4. A method as recited in claim 1, wherein the input term includes multiple, predefined, heterogeneous wild card characters.

5. A method as recited in claim 1, wherein matching the input term to the dictionary entry includes:

performing a prefix match to identify a sorted list of dictionary entries matching a prefix made up of characters in the input term that precede a first wild card character in the input term; and performing a binary search on the dictionary entries matching the prefix, the dictionary entries corresponding to a number of characters that the at least one wild card character represents.

6. A method as recited in claim 1, wherein the returning the entry includes refining the entry to enhance presentation.

7. A method as recited in claim 1, wherein the input term includes multiple, predefined, heterogeneous wild card characters including a single character wild card character and a zero to multi-character wild card character.

8. A method as recited in claim 1, wherein the input term comprises a request for a part of speech and the entry matches the part of speech.

9. A method as recited in claim 1, wherein the pattern of the input term includes one or more of a pattern string parameter that represents the input term, a patternStartIndex parameter that represents a location to start matching the input term to dictionary entries, or a patternLength parameter that represents a length of the input term in terms of a number of characters entered.

10. A method as recited in claim 1, wherein the first part of the input term is in the target language and the second part of the input term is in the initial language, the second part identifying at least one of a context or a domain for the wild card auto completion service in the initial language.

11. A computer-readable medium having computer executable instructions encoded thereon, the computer executable instructions for execution by a processor to perform wild card auto completion operations, the operations comprising:

accepting a request to a wild card auto completion service including an input term at least partly in a target language and partly in an initial language, wherein the initial language and the target language are two different languages, the service employing a syntax to accept the input term including zero to multiple wild card characters in the target language or in the initial language in a first part and a delimiter indicating a second part, the second part comprising the target language or the initial language such that: if the language of the first part includes the initial language, the second part includes the target language and if the language of the first part includes the target language, the second part includes the initial language, and the second part identifying at least one of a context or a domain for the wild card auto completion service;

identifying an initial-target language pair for the request;

aggregating two or more consecutive homogenous wild card characters, wherein the aggregating comprises replacing the two or more consecutive homogenous wild card characters with a single wild card character of a same type as the homogenous wild card character;

parsing the input term to identify a pattern of the input term;

matching the pattern of the input term to an entry; and returning the entry.

12. A computer-readable medium as recited in claim 11, wherein the input term includes one or more words.

13. The computer-readable medium of claim 11, wherein at least one of:

the input term includes multiple words and one of the multiple words is input in the initial language; or the input term includes multiple, predefined, heterogeneous wild card characters.

14. The computer-readable medium of claim 11, wherein matching the input term to the dictionary entry includes:

performing a prefix match to identify a sorted list of dictionary entries matching a prefix made up of characters in the input term that precede a first wild card character in the input term; and performing a binary search on the dictionary entries matching the prefix, the dictionary entries corresponding to a number of characters that the at least one wild card character represents.

15. The computer-readable medium of claim 11, wherein at least one of:

the input term includes multiple, predefined, heterogeneous wild card characters including a single character wild card character and a zero to multi-character wild card character; or the input term comprises a request for a part of speech and the entry matches the part of speech.

16. The computer-readable medium of claim 11, wherein the first part of the input term is in the target language and the second part of the input term is in the initial language, the second part identifying at least one of a context or a domain for the wild card auto completion service in the initial language.

17. The computer-readable medium of claim 11, wherein the wild card auto completion operations further comprise selecting a matcher corresponding to the pattern of the input term, wherein matching the pattern of the input term to the entry includes using the matcher selected.

18. A computing device comprising:

a processor;

a memory communicatively coupled to the processor, the memory storing modules comprising:

a wild card auto completion module configured to:

accept a request to a wild card auto completion service including an input term at least partly in a target language and partly in an initial language, wherein the initial language and the target language are two different languages, the service employing a syntax to accept the input term including zero to multiple wild card characters in the target language or in the initial language in a first part and a delimiter indicating a second part, the second part comprising the target language or the initial language such that: if the language of the first part includes the initial language, the second part includes the target language and if the language of the first part includes the target language, the second part includes the initial language, and the second part identifying at least one of a context or a domain for the wild card auto completion service;

identify an initial-target language pair for the request;

aggregate two or more consecutive homogenous wild card characters, wherein the aggregating comprises replacing the two or more consecutive homogenous wild card characters with a single wild card character of a same type as the homogenous wild card character;

parse the input term to identify a pattern of the input term; and return the list of results.

19. The computing device of claim 18, wherein the wild card auto completion module is further configured to:

select a matcher corresponding to the pattern of the input term; and match the input term to an entry using the matcher selected.

20. The computing device of claim 18, wherein the first part of the input term is in the target language and the second part of the input term is in the initial language, the second part identifying at least one of a context or a domain for the wild card auto completion service in the initial language.

\* \* \* \* \*